(12) United States Patent
Clark et al.

(10) Patent No.: US 11,235,402 B2
(45) Date of Patent: Feb. 1, 2022

(54) SAW BLADES AND METHODS OF MACHINING SAW BLADE TOOTH PROFILES OF SAW BLADES

(71) Applicant: Simonds International L.L.C., Ridgefield, WA (US)

(72) Inventors: Derek Clark, Portland, OR (US); Clifton Koski, II, Milwaukie, OR (US); Larry McMaster, Troutdale, OR (US)

(73) Assignee: Simonds International L.L.C., Ridgefield, WA (US)

( * ) Notice: Subject to any disclaimer, the term of this patent is extended or adjusted under 35 U.S.C. 154(b) by 70 days.

(21) Appl. No.: 15/950,840

(22) Filed: Apr. 11, 2018

(65) Prior Publication Data

US 2018/0229318 A1    Aug. 16, 2018

Related U.S. Application Data

(62) Division of application No. 15/251,712, filed on Aug. 30, 2016, now Pat. No. 9,975,192.

(51) Int. Cl.
*B23D 65/04* (2006.01)
*B23D 61/12* (2006.01)
(Continued)

(52) U.S. Cl.
CPC .............. *B23D 63/008* (2013.01); *B23C 3/12* (2013.01); *B23D 61/121* (2013.01); *B23D 63/003* (2013.01); *B23D 63/005* (2013.01); *B23D 63/08* (2013.01); *B23D 65/04* (2013.01); *B23C 2220/28* (2013.01); *B23C 2260/76* (2013.01)

(58) Field of Classification Search
CPC ........ B23D 61/12; B23D 61/14; B23D 63/08; B23D 61/121; B23D 61/123; B23D 61/02; B23D 61/021; B23D 61/00; B23D 61/06; B23D 63/003; B23D 63/005; B23D 63/008; B23D 63/20–208; B65D 65/00;
(Continued)

(56) References Cited

U.S. PATENT DOCUMENTS 149,562 A * 4/1874 Bentley ................ B23D 61/121
83/849
326,685 A * 9/1885 Simonds .............. B23D 61/021
83/840
(Continued)

*Primary Examiner* — Ghassem Alie
*Assistant Examiner* — Samuel A Davies
(74) *Attorney, Agent, or Firm* — Dascenzo Gates Intellectual Property Law, P.C.

(57) ABSTRACT

Saw blades and methods of machining saw blade tooth profiles of saw blades. The saw blades include a blade body and a plurality of teeth defined by the blade body. Each tooth includes a tooth back, a tooth tip, a tooth face, and a tooth gullet. In at least one tooth, a relief region extends toward the tooth back and separates the tooth face from the tooth gullet. The methods include supporting the saw blade with a blade support structure and advancing the saw blade with a blade advance structure. The methods also include dry-machining a finished tooth profile in a working portion of the saw blade in a single pass. The dry-machining includes dry-machining with an end mill by operatively translating the end mill relative to the saw blade and within a plane that is at least substantially perpendicular to an end mill rotational axis of the end mill.

15 Claims, 9 Drawing Sheets

(51) Int. Cl.
  *B23D 63/00* (2006.01)
  *B23C 3/12* (2006.01)
  *B23D 63/08* (2006.01)

(58) Field of Classification Search
  CPC .... B65D 65/02; B65D 65/04; B23C 2220/28; B23C 3/10; B23C 3/12
  USPC .................................. 76/50.2, 51–57; D8/20
  See application file for complete search history.

(56) References Cited

U.S. PATENT DOCUMENTS

| | | | | |
|---|---|---|---|---|
| 352,867 A * | 11/1886 | Greist | .................. | B23D 61/021 83/848 |
| 373,581 A * | 11/1887 | Boynton | .............. | B23D 61/121 83/848 |
| 552,370 A * | 12/1895 | Holley | ................. | B23D 61/021 83/855 |
| 820,969 A * | 5/1906 | Grelck | ................. | B23D 61/121 83/851 |
| 1,487,589 A | 3/1924 | Miner et al. | | |
| 1,943,863 A * | 1/1934 | Gommel | ................ | B23D 63/06 76/54 |
| 1,955,137 A * | 4/1934 | Paulsen | ................... | B27B 33/02 83/852 |
| 2,071,618 A * | 2/1937 | Ferrari | ................. | B23D 61/121 144/376 |
| 2,241,703 A * | 5/1941 | Gommel | ................ | B23D 61/12 83/853 |
| 2,972,364 A * | 2/1961 | Standal | ................... | B23D 61/06 83/853 |
| 3,110,952 A * | 11/1963 | Anderson | .............. | B23D 65/00 83/661 |
| 3,236,271 A * | 2/1966 | Fruits | ................... | B23D 61/021 83/842 |
| 3,362,446 A * | 1/1968 | Potomak | ................ | B23D 61/04 83/855 |
| 4,292,871 A * | 10/1981 | Neumeyer | ............. | B23D 61/12 76/112 |
| 4,603,613 A * | 8/1986 | Wilson | .................. | B23D 61/123 83/635 |
| 4,677,881 A | 7/1987 | Jorde | | |
| 5,249,485 A | 10/1993 | Hayden, Sr. | | |
| 5,379,672 A * | 1/1995 | Thomas | ............... | B23D 61/021 83/837 |
| 5,471,897 A | 12/1995 | Wright | | |
| 6,065,370 A * | 5/2000 | Curtsinger | ........... | B23D 61/025 76/112 |
| 6,167,792 B1 * | 1/2001 | Korb | .................... | B23D 61/121 83/835 |
| 6,205,902 B1 * | 3/2001 | Vuorinen | ............... | B23D 61/06 76/112 |
| 6,329,624 B1 * | 12/2001 | Lenard | ................. | B23D 63/001 219/69.17 |
| D564,864 S | 3/2008 | Johnson et al. | | |
| 7,854,183 B2 | 12/2010 | Weatherly, Sr. et al. | | |
| 7,861,617 B2 | 1/2011 | Weatherly, Sr. et al. | | |
| 7,908,954 B2 | 3/2011 | Forsberg et al. | | |
| 8,621,972 B2 * | 1/2014 | Nagano | ................ | B23D 61/121 83/846 |
| 2001/0015120 A1 | 8/2001 | Hickey | | |
| 2002/0035893 A1 | 3/2002 | Schurb et al. | | |
| 2002/0078796 A1 * | 6/2002 | Brown | ................. | B23D 63/005 76/37 |
| 2004/0050213 A1 | 3/2004 | Forsberg et al. | | |
| 2004/0065183 A1 * | 4/2004 | Asada | .................. | B23D 61/021 83/838 |
| 2004/0118263 A1 * | 6/2004 | Hellbergh | ............ | B23D 61/121 83/846 |
| 2004/0185760 A1 | 9/2004 | Weatherly et al. | | |
| 2004/0255740 A1 * | 12/2004 | Troyer | ................. | B23D 61/121 83/13 |
| 2004/0255749 A1 | 12/2004 | Hayden, Sr. | | |
| 2006/0065098 A1 * | 3/2006 | Cranna | ................. | B23D 61/121 83/661 |
| 2007/0214922 A1 * | 9/2007 | Cook | ..................... | B23D 61/12 83/13 |
| 2008/0236340 A1 * | 10/2008 | Weatherly | .............. | B23D 63/06 76/57 |
| 2011/0265627 A1 * | 11/2011 | Kwanka | ................ | B23D 61/121 83/661 |
| 2012/0230788 A1 * | 9/2012 | Bozic | ................... | B23D 61/121 408/209 |
| 2013/0125724 A1 * | 5/2013 | MacLennan | ......... | B23D 61/021 83/469 |
| 2013/0133502 A1 * | 5/2013 | Grolimund | ............ | B23D 61/14 83/846 |
| 2014/0150620 A1 * | 6/2014 | Elliston | ................ | B23D 61/121 83/661 |
| 2015/0190871 A1 | 7/2015 | Dexter | | |
| 2015/0343541 A1 | 12/2015 | Gilman et al. | | |
| 2017/0056989 A1 * | 3/2017 | Vogel | ................... | B23D 61/121 |

\* cited by examiner

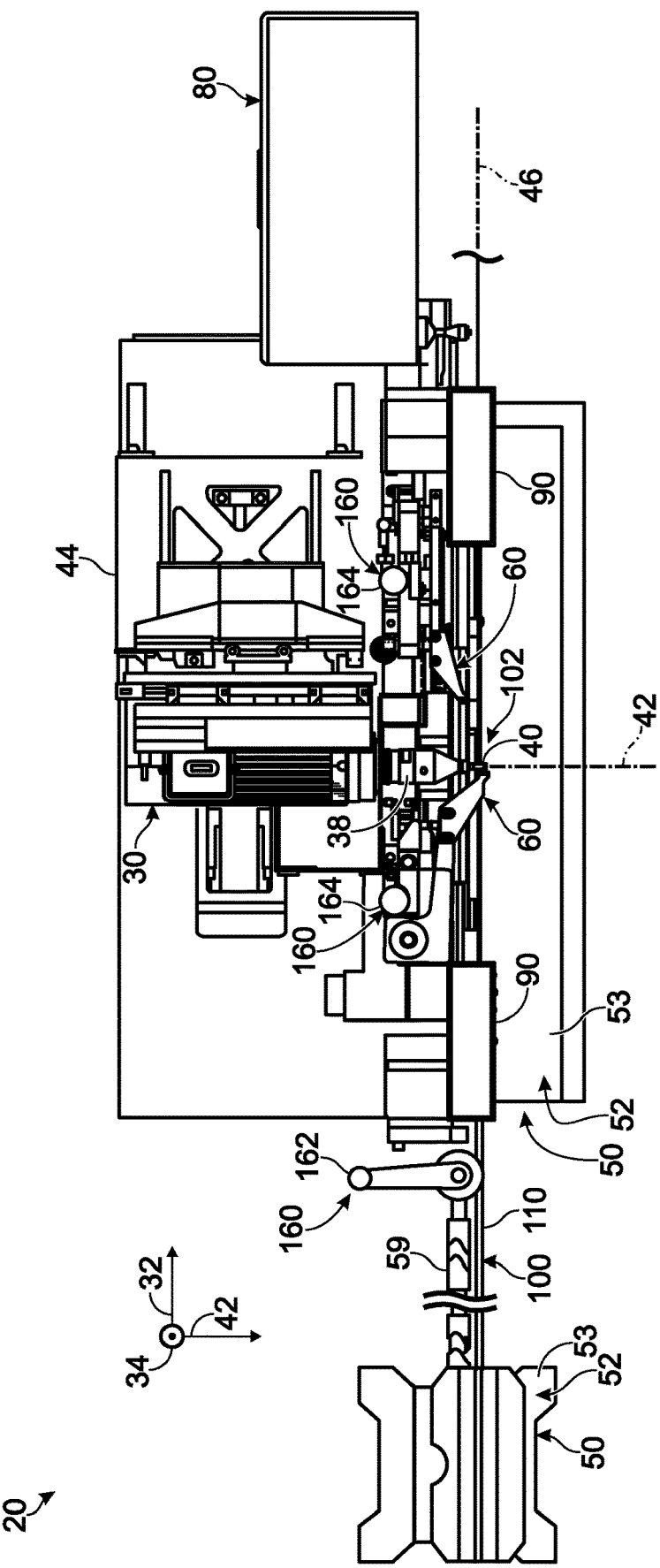

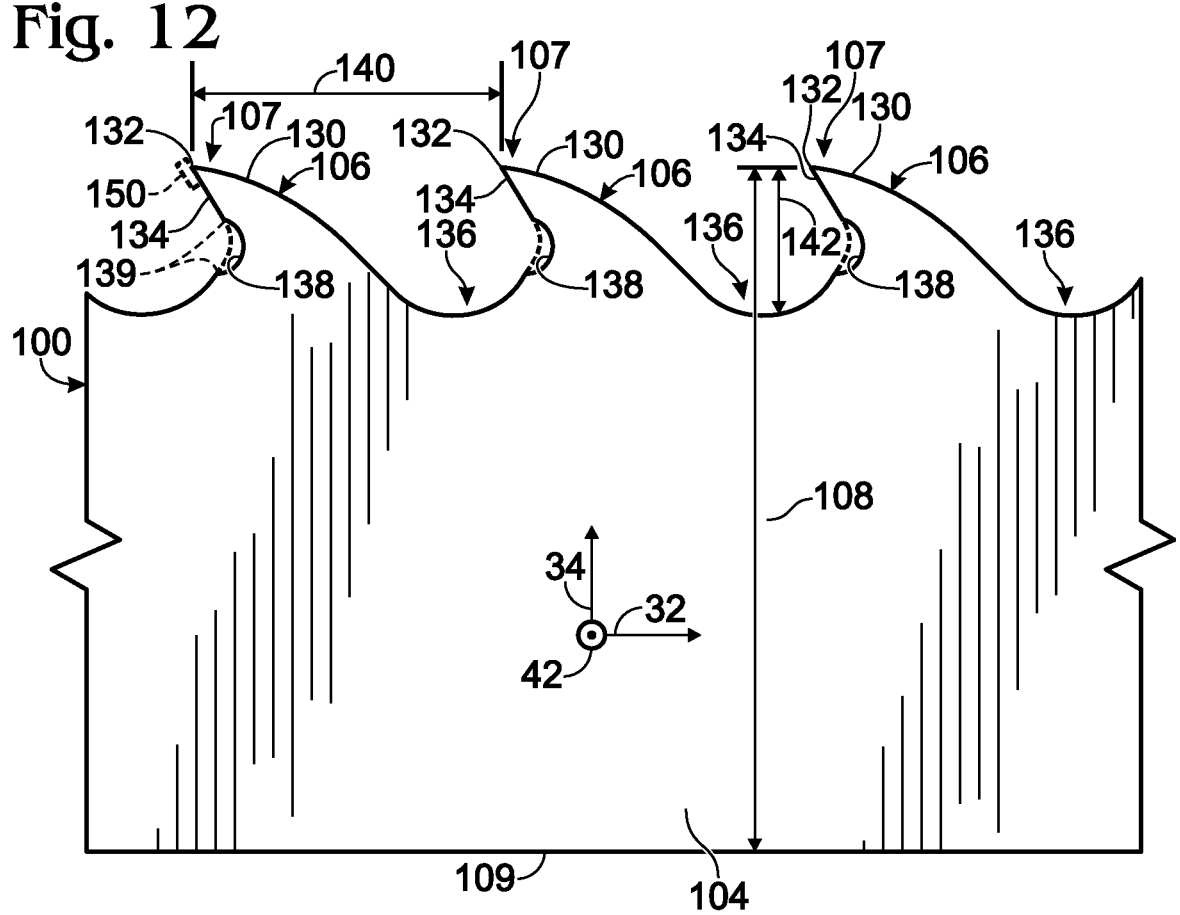

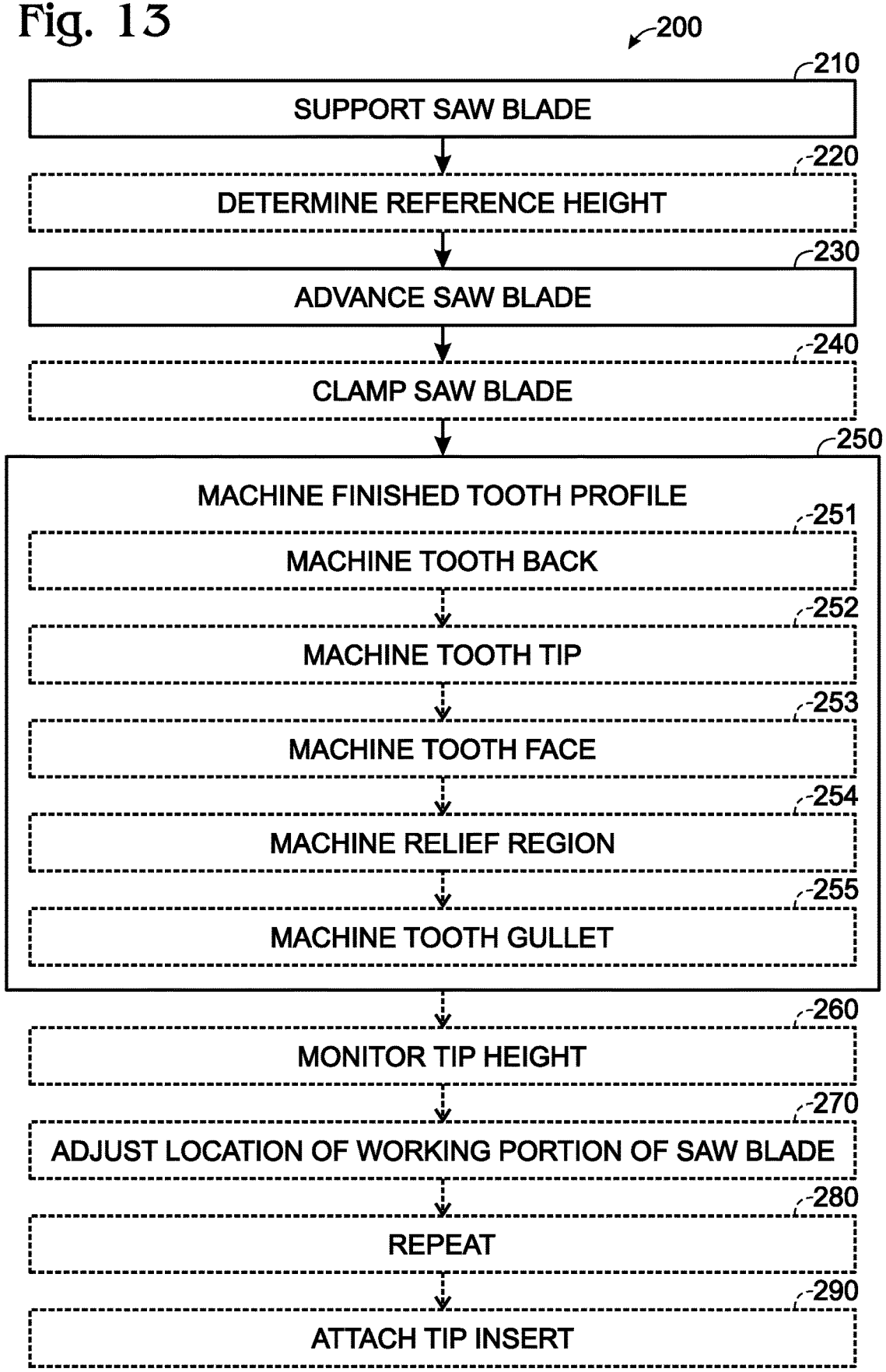

SAW BLADES AND METHODS OF MACHINING SAW BLADE TOOTH PROFILES OF SAW BLADES

RELATED APPLICATION

The present application is a divisional of and claims priority to U.S. patent application Ser. No. 15/251,712, entitled SYSTEMS AND METHODS FOR MILLING SAW BLADE TOOTH PROFILES AND SAW BLADES WITH MILLED TOOTH PROFILES, which was filed on Aug. 30, 2016, and the complete disclosure of which is hereby incorporated by reference for all purposes.

FIELD OF THE DISCLOSURE

The present disclosure relates generally to systems and methods for milling saw blade tooth profiles, as well as to saw blades with milled tooth profiles.

BACKGROUND OF THE DISCLOSURE

Saw blades, such as saw blades for sawing lumber or other wood materials, generally are formed utilizing a multi-step manufacturing process. In the context of bandsaw blades, this manufacturing process may include laying out a strip of metal, which will be formed into the bandsaw blade, and forming and/or defining a plurality of rough-cut saw teeth within the strip of metal. Subsequently, the ends of the strip of metal are welded together, or otherwise joined, to form and/or define a band, and the band is tensioned across a width thereof.

Whether the blade is a bandsaw blade or a circular saw blade, the rough-cut saw teeth may be roughly defined within the saw blade utilizing any suitable process, such as laser cutting, water jet cutting, and/or punching. In the case of laser cutting, the cutting process heats the saw blade, and the resultant rough-cut saw teeth include a heat-affected zone, which may be several thousandths of an inch thick. This heat-affected zone is harder than a remainder of the saw blade, and the presence of the heat-affected zone may be detrimental to the longevity of the saw blade. As an example, a gullet of the saw blade may crack if the heat-affected zone is not removed.

In addition, the rough-cut saw teeth may vary in height. This height variation may be on the order of several tens of thousandths of an inch and may be detrimental to the performance and/or longevity of the saw blade.

Subsequently, a final, finished, and/or desired tooth profile is formed and/or defined within the saw blade. The operation that is utilized to form the finished tooth profile also may be utilized to remove the heat-affected zone and/or to decrease the height variation among the teeth. After formation of the finished tooth profile, a cutting edge, or tip, may be swaged into each tooth and/or brazed, or welded, onto each tooth.

Generally, removal of the heat-affected zone, decreasing the height variation, and definition of the finished tooth profile are performed concurrently via a grinding operation. This grinding operation may be a multiple-pass dry-grinding operation in which a few (generally 3-5) thousandths of an inch (0.076-0.127 millimeters) of metal is removed during each of several dry-grinding passes. The dry-grinding passes progressively remove the heat-affected zone while, at the same time, progressively changing the shape of the teeth until the finished tooth profile is obtained.

While grinding operations may be effective under certain circumstances, they have distinct limitations. As an example, the process of grinding the saw blade also can heat the saw blade. Thus, care must be taken to ensure that the grinding operation progresses slowly enough, or is sufficiently cooled, to avoid heating the saw blade above a critical temperature at which formation of a new heat-affected zone occurs. As another example, and as discussed, dry-grinding operations generally require a number of passes, causing the dry-grinding operation to be the most, or one of the most, costly and time-consuming steps in the manufacture of a saw blade.

As yet another example, a wet-grinding operation may be utilized to define the finished tooth profile. Such wet-grinding operations utilize a liquid coolant to cool the saw blade, thereby permitting the finished tooth profile to be defined in fewer passes than generally are required for dry grinding operations. However, wet-grinding operations require frequent dressing of the grinding wheel, which significantly increases the time required to perform the wet-grinding operation. In addition, wet-grinding operations also represent an environmental hazard in the context of liquid coolant disposal. Furthermore, wet-grinding operations that utilize a hydrocarbon coolant may pose a fire hazard and may require explosion and/or fire suppression systems, further increasing the cost and/or complexity of such operations.

As another example, a grinding wheel that is utilized during the grinding operation exhibits a significant amount of wear and must be re-dressed several times during the grinding of a single saw blade, adding to the time and cost of grinding the saw blade. As yet another example, it may be challenging to maintain a desired level of tooth tip height uniformity when defining saw teeth with the grinding operation. As another example, the tooth profiles that may be defined by the grinding operation are limited due to the large diameter of the grinding wheel. As yet another example, and in the case of the wet-grinding operation, a coolant that is utilized during the wet-grinding operation may pose an environmental disposal hazard. Thus, there exists a need for improved systems and methods for manufacturing saw blades.

SUMMARY OF THE DISCLOSURE

Saw blades and methods of machining saw blade tooth profiles of saw blades. The saw blades include a blade body and a plurality of teeth defined by the blade body. Each tooth in the plurality of teeth includes a tooth back, a tooth tip, a tooth face, and a tooth gullet. In at least one tooth of the plurality of teeth, a relief region extends toward the tooth back and separates the tooth face from the tooth gullet.

The methods include supporting the saw blade with a blade support structure and advancing the saw blade with a blade advance structure. The methods also include dry-machining a finished tooth profile in a working portion of the saw blade in a single pass. The supporting includes supporting such that a side of the saw blade extends at least substantially perpendicular to an end mill rotational axis of the end mill. The advancing includes advancing such that a target portion of the saw blade defines a working portion of the saw blade. The dry-machining includes dry-machining with an end mill by operatively translating the end mill relative to the saw blade and within a plane that is at least substantially perpendicular to the end mill rotational axis.

BRIEF DESCRIPTION OF THE DRAWINGS

FIG. 3 is a less schematic top view of a blade milling system for machining tooth profiles in saw blades, according to the present disclosure.

FIG. 12 is a less schematic illustration of a tooth profile that may be defined utilizing the systems and methods according to the present disclosure.

FIG. 13 is a flowchart depicting methods, according to the present disclosure, of machining a saw blade tooth profile of a saw blade with a blade milling system.

DETAILED DESCRIPTION AND BEST MODE OF THE DISCLOSURE

Figure 1:
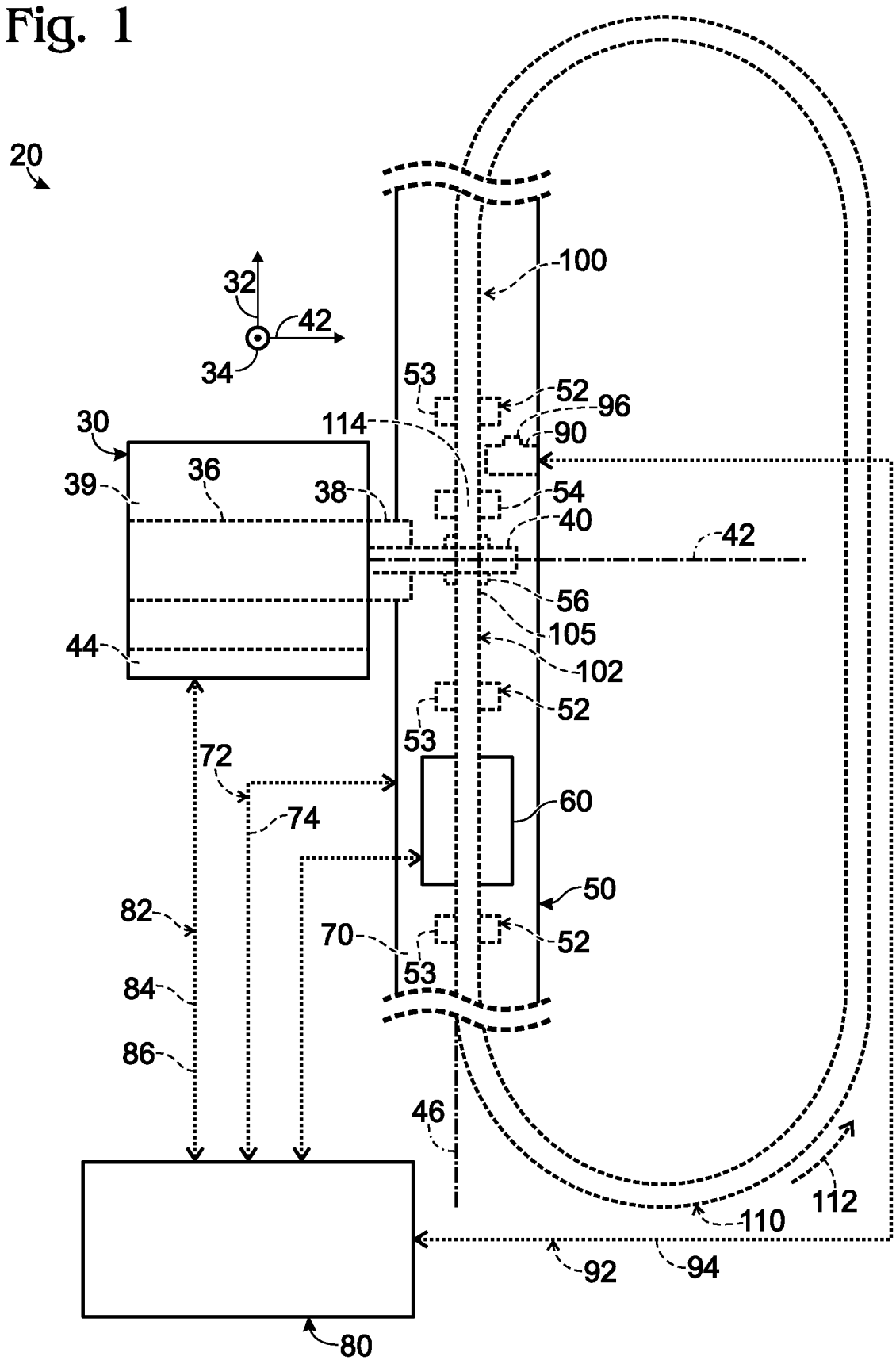
FIG. 1 is a schematic top view illustrating examples of blade milling systems for machining tooth profiles in saw blades, according to the present disclosure.

FIGS. 1-13 provide examples of blade milling systems 20, of components and/or portions of blade milling systems 20, of saw blades 100, and/or of methods 200, according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 2:
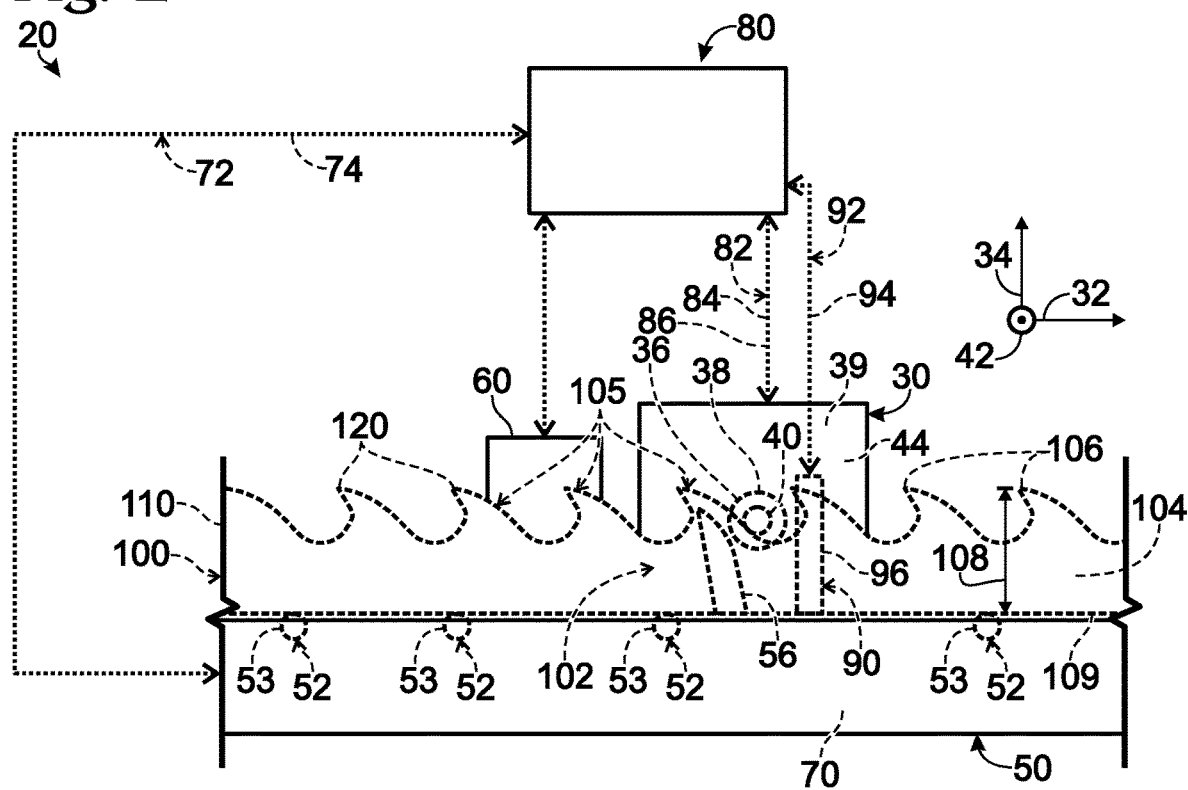
FIG. 2 is a schematic side view of the blade milling systems of FIG. 1.
Figure 7:
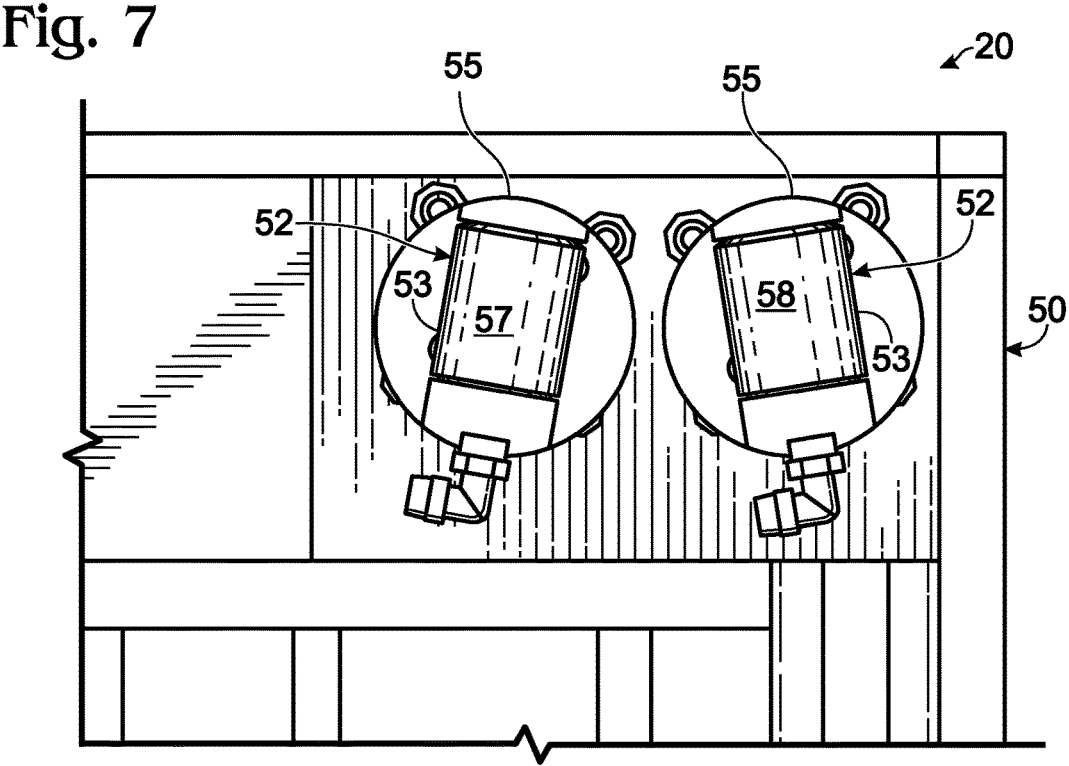
FIG. 7 is a less schematic side view of a portion of a blade support structure that may be included in and/or utilized with the blade milling systems according to the present disclosure.
Figure 4:
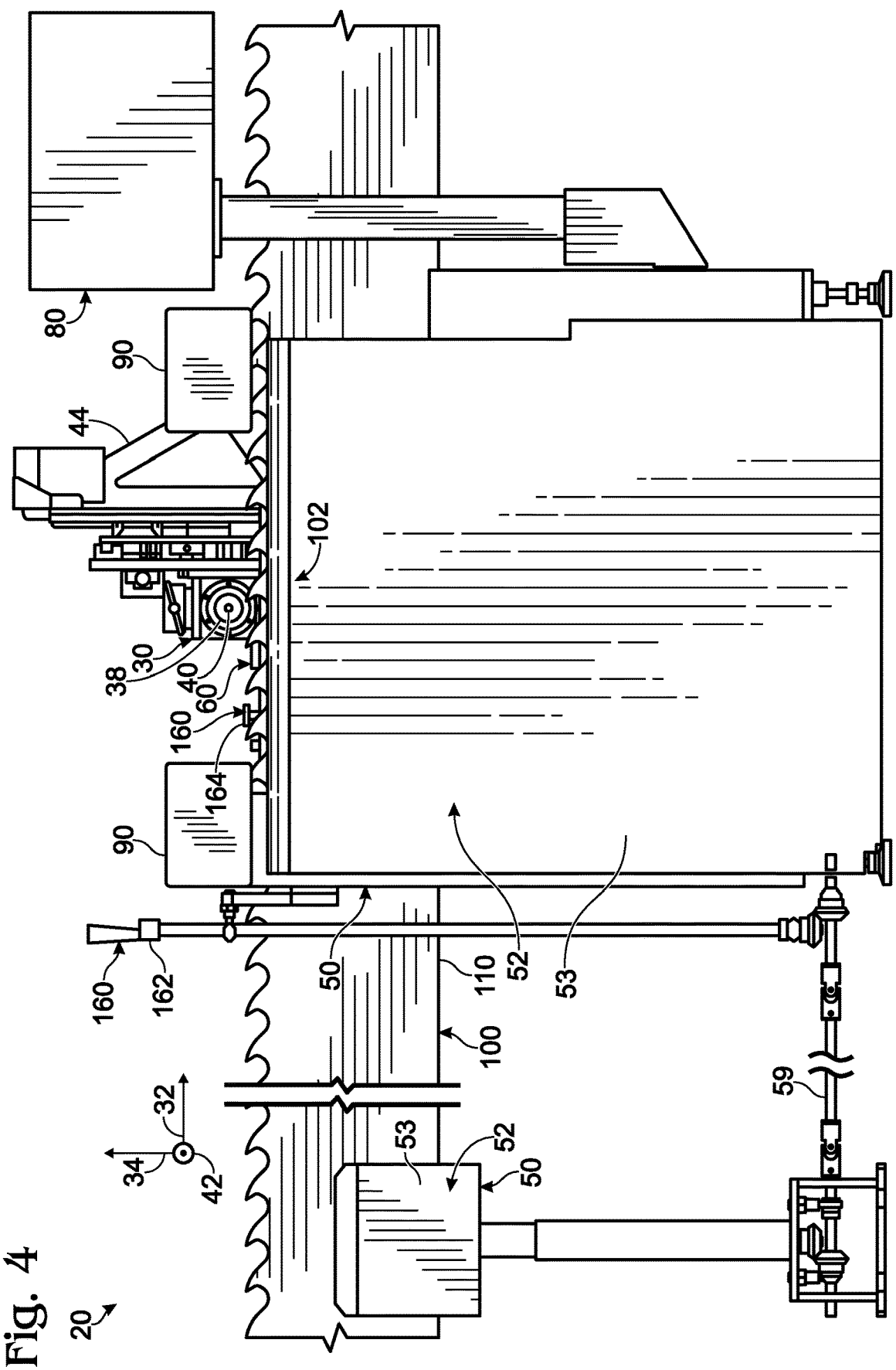
FIG. 4 is a less schematic side view of the blade milling system of FIG. 3.
Figure 5:
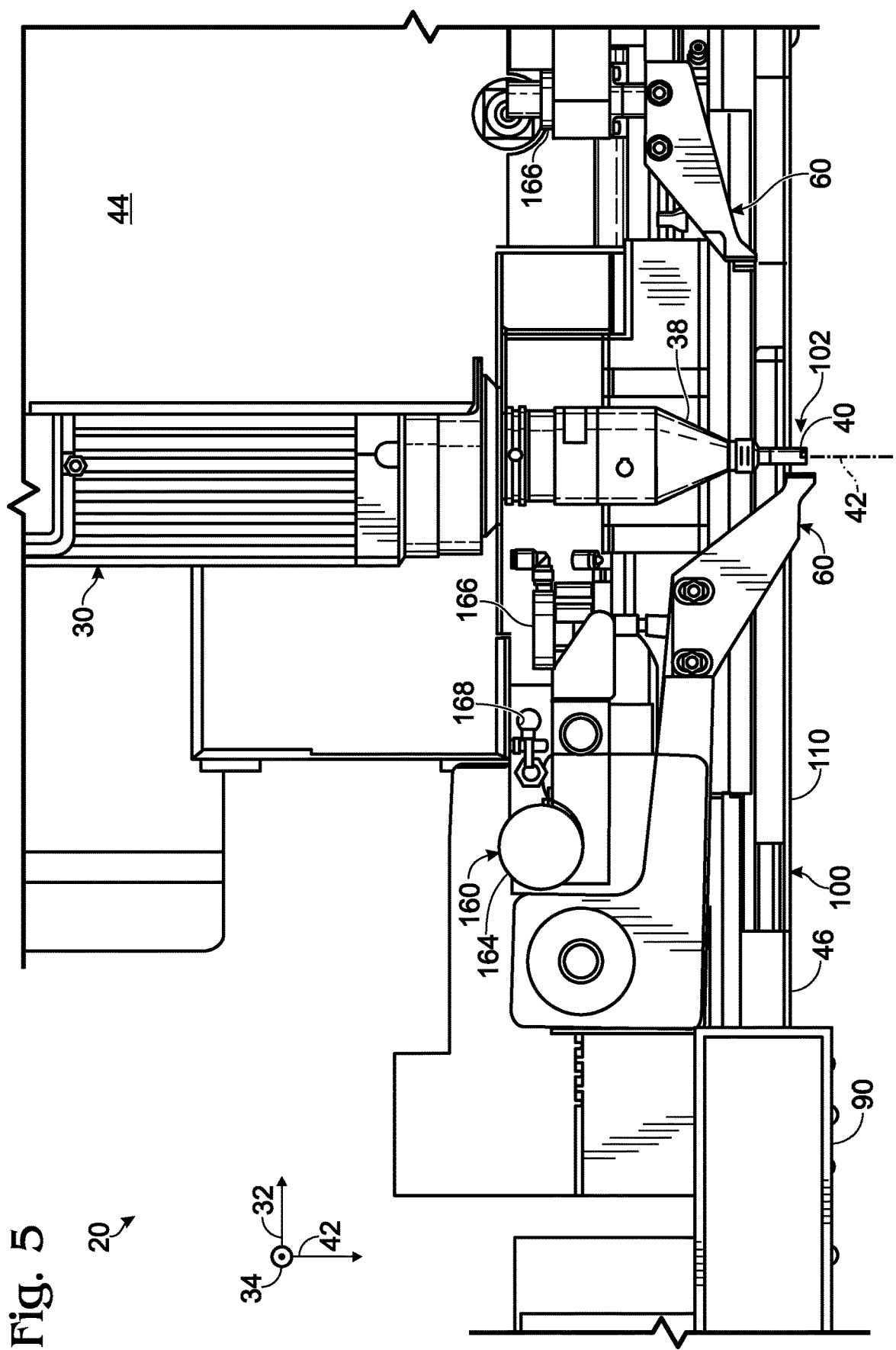
FIG. 5 is a less schematic top view of a portion of the blade milling system of FIGS. 3-4.
Figure 6:
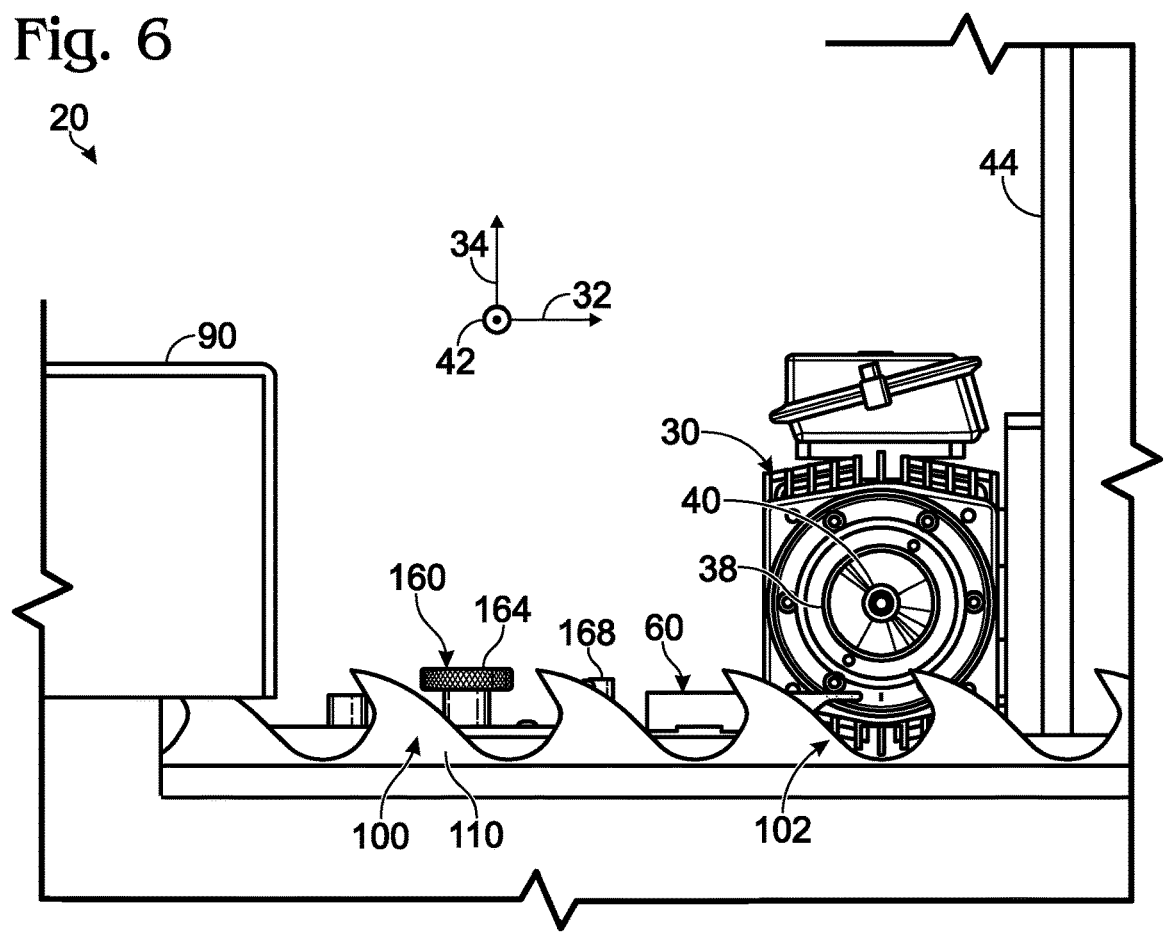
FIG. 6 is a less schematic side view of a portion of the blade milling system of FIGS. 3-4.

FIG. 1 is a schematic top view illustrating examples of blade milling systems 20 for machining tooth profiles in saw blades 100, according to the present disclosure, while FIG. 2 is a schematic side view of the blade milling systems of FIG. 1. FIG. 3 is a less schematic top view of a blade milling system 20 for machining tooth profiles in saw blades 100, according to the present disclosure, while FIG. 4 is a less schematic side view of the blade milling system of FIG. 3, FIG. 5 is a less schematic top view of a portion of the blade milling system of FIGS. 3-4, and FIG. 6 is a less schematic side view of a portion of the blade milling system of FIGS. 3-4. FIG. 7 is a less schematic side view of a portion of a blade support structure that may be included in and/or utilized with the blade milling systems according to the present disclosure.

As illustrated collectively by FIGS. 1-7, blade milling systems 20 include a milling head 30, a blade support structure 50, a blade advance structure 60, and a control system 80. Milling head 30 is configured to rotate an end mill 40 about an end mill rotational axis 42 and also to operatively translate the end mill within an end mill translation plane 46 that is perpendicular, or at least substantially perpendicular, to the end mill rotational axis. Blade support structure 50 is configured to operatively support a saw blade 100 relative to milling head 30 and/or end mill rotational axis 42 such that a working portion 102 of the saw blade extends within end mill translation plane 46. Blade advance structure 60 is configured to selectively and progressively advance saw blade 100 relative to milling head 30 and/or end mill 40 to selectively define working portion 102 of the saw blade.

As used herein, the phrase "at least substantially" is intended to convey that a particular parameter effectively, essentially, or in essence possesses a given characteristic. Stated another way the phrase "at least substantially" should be interpreted to mean that the particular parameter, from a practical perspective, possesses the given characteristic, or is intended to possess the given characteristic while, at the same time, recognizing the fact that absolute matches often are difficult to achieve under real-world conditions. As an example, end mill translation plane 46 is described as being "at least substantially perpendicular" to the end mill rotational axis, and this should be interpreted to mean that the end mill translation plane is intended to be, or is effectively, perpendicular to the end mill rotational axis while recognizing that it may not be practical, or at least economical, to ensure that the end mill translation plane is exactly perpendicular to the end mill rotational axis in all systems, at all times, and/or under all circumstances.

During operation of blade milling systems 20, and as discussed in more detail herein with reference to methods 200 of FIG. 13, control system 80 is programmed to control the operation of at least blade advance structure 60 and milling head 30. As an example, control system 80 may be programmed to operatively position saw blade 100 relative to milling head 30 and/or end mill rotational axis 42. This may include operatively positioning saw blade 100 such that a target, or desired, portion, or region, of the saw blade defines the working portion of the saw blade.

As used herein, the "working portion of the saw blade" may include the portion of the saw blade that will be milled by end mill 40 during a given period of time. Stated another way, the "working portion of the saw blade" may include a region of the saw blade that is, or that may be, milled by end mill 40 due solely to translation of end mill 40 by milling head 30 (i.e., while saw blade 100 remains at least substantially fixed in space relative to blade support 50). Generally, the "working portion of the saw blade" will include at least a tooth back, a tooth tip, a tooth face, and a tooth gullet of at least one tooth; however, this is not required of all embodiments. Stated another way, the "working portion of the saw blade" may include a portion of the saw blade that extends between a tooth gullet of an adjacent tooth and a tooth gullet of a tooth that presently is being milled by end mill 40.

As another example, control system 80 may be programmed to operatively translate milling head 30 within end mill translation plane 46 and/or relative to working portion 102 of saw blade 100 such that the end mill machines the working portion of the saw blade. This may include machining to form and/or define a desired, target, or finished tooth profile within the working portion of the saw blade.

The blade milling systems and methods disclosed herein may provide significant benefits over prior art systems and methods for forming and/or defining teeth on a saw blade. As an example, and as discussed, grinding operations historically have been utilized to at least partially define the teeth. As also discussed, dry-grinding operations generally require a plurality of passes to remove the heat-affected zone from the saw blade and concurrently define the finished tooth profile. The plurality of passes may be required because the grinding operation itself causes significant heating of the saw blade and actually may produce, or increase a size of, the heat-affected zone.

In contrast, the blade milling systems and methods disclosed herein may not significantly heat the saw blade since heat generated by the milling process may be removed in metal chips produced during the milling process. Thus, the blade milling systems and methods disclosed herein may, or may be utilized to, remove the heat affected zone and concurrently define the finished tooth profile in a single pass, which may decrease the time needed for these operations by a factor of 2-3 when compared to prior art grinding operations.

As another example, and as also discussed, wet-grinding operations also have been utilized to at least partially define teeth of saw blades. While wet-grinding operations may be capable of defining the finished tooth profile in a single pass, the wet-grinding operations suffer from several other inherent limitations, including the need to re-dress the grinding wheel several times during the grinding of a single tooth and the environmental hazards associated with disposal of the liquid coolant that is utilized in the wet-grinding operations.

As yet another example, the blade milling systems and methods disclosed herein may provide improved control over the tip height of a tooth tip that is formed thereby when compared to grinding operations. This improved control over tip height may result in better saw blade performance when the saw blade is utilized to cut wood.

As another example, the blade milling systems and methods disclosed herein may experience less wear when compared to grinding operations. More specifically, end mill 40 may wear less, or be more durable, than a grinding wheel. As such, less time may be spent replacing the end mill when compared to the time spent dressing a grinding wheel and/or the final tooth profile may be more uniform across the saw blade when compared to teeth that are defined by grinding.

As an example, it may be necessary to dress the grinding wheel several times during the grinding of a single saw blade, such as during each of the 3-5 passes that generally are utilized when grinding the finished tooth profile and/or after grinding 200-300 teeth. In addition, dressing the grinding wheel may, on average, take 30-120 seconds. In contrast, an appropriately utilized end mill may be utilized to completely machine at least 2000-3000 teeth prior to replacement (e.g., approximately 100 saw blades), and replacing the end mill may take only about 15 seconds. Thus, over the life of a single end mill, several hours may be saved by utilizing the systems and methods according to the present disclosure when compared to prior art grinding operations.

As yet another example, grinding operations that traditionally are utilized to remove the heat-affected zone and/or to define the finished tooth profile generally only can form a finished tooth profile with a single handedness. Thus, if a finished tooth profile with an opposed handedness is to be ground, the saw blade must be inverted. Alternatively, and in the case of bandsaw blades, the grinding tool may be placed inside or outside a loop of the saw blade depending on the handedness of the saw blade. These processes may be time-consuming and/or may require additional care to avoid injuries. In contrast, the blade milling systems and methods disclosed herein may be utilized to create any finished tooth profile of any handedness simply by programming the finished tooth profile into control system 80. In addition, the blade milling systems and methods disclosed herein readily may be utilized to create saw blades with varying tooth profiles and/or varying tooth pitch.

As another example, the blade milling systems and methods disclosed herein may be utilized to produce and/or generate tooth profiles, or shapes, that cannot be, or at least cannot be economically, produced by grinding operations. As an example, and as discussed in more detail herein, the disclosed blade milling systems and methods may be utilized to mill a relief region in a tooth. As another example, the disclosed blade milling systems and methods readily may be utilized to create and/or generate a saw blade that includes several different tooth profiles. The teeth and tooth profiles disclosed herein may be, but are not required in all embodiments to be, referred to as cutting teeth and cutting tooth profiles, respectively. As used herein, a cutting tooth is a saw blade tooth that is configured to cut into and/or through a workpiece. In the context of a wood-cutting saw blade, the cutting teeth are configured to cut into and/or through the wood workpiece, such as timber, lumber, etc.

Returning generally to blade milling systems 20 illustrated in FIGS. 1-6, milling head 30 may include any suitable structure that rotates end mill 40 about end mill rotational axis 42 and/or that translates end mill 40 within end mill translation plane 46. As an example, milling head 30 may include a spindle 36 and a tool holder 38 that is operatively attached to the spindle. Tool holder 38 may grip end mill 40, and spindle 36 may rotate, thereby rotating end mill 40 about the end mill rotational axis.

Milling head 30 also may be configured to oscillate, or repeatedly extend and retract, end mill 40 along end mill rotational axis 42. This oscillation may occur during rotation of the end mill about the end mill rotational axis and/or during milling of the tooth profiles in the saw blade, and milling head 30 may include an oscillation structure 39 (as illustrated in FIGS. 1-2) that facilitates this oscillation. As discussed in more detail herein, such oscillation may decrease wear on the end mill, may improve uniformity of the finished tooth profile, and/or may permit a greater length of a cutting edge of the end mill to be utilized to mill the saw blade. Examples of oscillation structure 39 include a rack and pinion assembly and/or a lead screw/ball screw assembly configured to extend and/or retract spindle 36 along the end mill rotational axis.

As discussed, milling head 30 is configured to both rotate end mill 40 about end mill rotational axis 42 and to operatively translate, move, and/or pivot end mill 40 within end mill translation plane 46. Stated another way, spindle 36 may grip end mill 40 and may be rotated, by milling head 30, to rotate the end mill about the end mill rotational axis. Concurrently, or at least partially concurrently, a translation stage 44 may be utilized to translate, or move, milling head 30 along a first translational axis 32 and/or along a second translational axis 34. As an example, milling head 30 may be configured to operatively translate, or to concurrently and operatively translate, end mill 40 along first translational axis 32 and also along second translational axis 34. First translational axis 32 and second translational axis 34 may extend within end mill translation plane 46, and second translational axis 34 may be perpendicular, or at least substantially perpendicular, to first translational axis 32.

It is recognized that end mill 40 has a finite length that extends perpendicular to end mill translation plane 46. As such, and from a practical perspective, end mill 40 operatively translates within an infinite number of planes that are parallel to end mill translation plane 46. However, as illustrated in FIG. 1, end mill translation plane 46 is coplanar with and/or extends through working portion 102 of saw blade 100. Thus, operative translation of any portion of end mill 40 within end mill translation plane 46 may be utilized to machine and/or mill saw blade 100, thereby producing and/or generating one or more finished tooth profiles therein.

As used herein, the term "along," when utilized in conjunction with a geometric axis, is intended to describe motion in a direction that is parallel to, but not necessarily coaxial with, the geometric axis. As an example, end mill 40 is described as translating along the first translational axis and along the second translational axis. Thus, this translational motion may include movement in a plane defined by these axes without necessarily requiring movement, or equal movement, that is coaxial with either axis. As such, the motion may be in directions that are parallel to the given axes and/or in a plane defined thereby.

This operative translation may be accomplished in any suitable manner. As an example, milling head 30 may include translation stage 44 that may be configured to permit and/or facilitate this operative translation. Translation stage 44 may be an electronically controlled translation stage, and control system 80 may control the operation of the translation stage to control the motion of end mill 40 within end mill translation plane 46. Translation stage 44 may include any suitable structure, examples of which include a lead screw and nut assembly, a ball screw assembly, a rack and pinion assembly, a motor, a servo motor, an electric motor, and a stepper motor.

As also discussed, control system 80 may be programmed to control the operation of at least a portion of milling head 30, such as spindle 36, oscillation structure 39, and/or translation stage 44. As illustrated in FIGS. 1-2, to facilitate this control, and although not required, blade milling system 20 may include a milling head control conductor 82 that extends between milling head 30 and control system 80. Milling head control conductor 82 may be configured to convey a milling head control signal 84, which may be generated by control system 80, from control system 80 to milling head 30. Additionally or alternatively, milling head control conductor 82 may be configured to convey a milling head status signal 86, which may be generated by milling head 30, from milling head 30 to control system 80.

Blade support structure 50 may include any suitable structure that may, or that may be utilized to, operatively support saw blade 100 relative to milling head 30. As an example, saw blade 100 may include, or be, a bandsaw blade 110 that defines a blade length as measured about a perimeter 112 thereof. Under these conditions, blade support structure 50 may include a plurality of bandsaw-contacting structures 52 that are configured to support at least a portion of the bandsaw blade. This may include supporting a portion, or fraction, of the length of the bandsaw blade, supporting an entirety of the length of the bandsaw blade, and/or supporting the bandsaw blade along an entirety of the length thereof.

Examples of bandsaw-contacting structures 52 include rollers 53, which are illustrated in FIG. 7. In the example of FIG. 7, rollers 53 may be selectively engaged with and/or disengaged from the saw blade via an actuator 55. In addition, and in the example of FIG. 7, rollers 53 include a clockwise-tilted roller 57 and a counterclockwise-tilted roller 58. These tilted rollers may be selectively engaged with and/or disengaged from the saw blade depending upon the handedness of the saw blade and/or depending upon a direction in which the saw blade travels through blade support structure 50. As an example, and with continued reference to FIG. 7, clockwise-tilted roller 57 may be engaged with the saw blade and counterclockwise-tilted roller 58 may be disengaged from the saw blade when the saw blade travels from left-to-right within the blade support structure. As another example, clockwise-tilted roller 57 may be disengaged from the saw blade and counterclockwise-tilted roller 58 may be engaged with the saw blade when the saw blade travels from right-to-left within the blade support structure. Such a configuration may press the saw blade into the blade support structure during motion therethrough, thereby maintaining a known and/or fixed relative height orientation between saw blade 100, or tooth tips 132 thereof, and blade milling system 20, or blade support structure 50 thereof.

Figure 8:
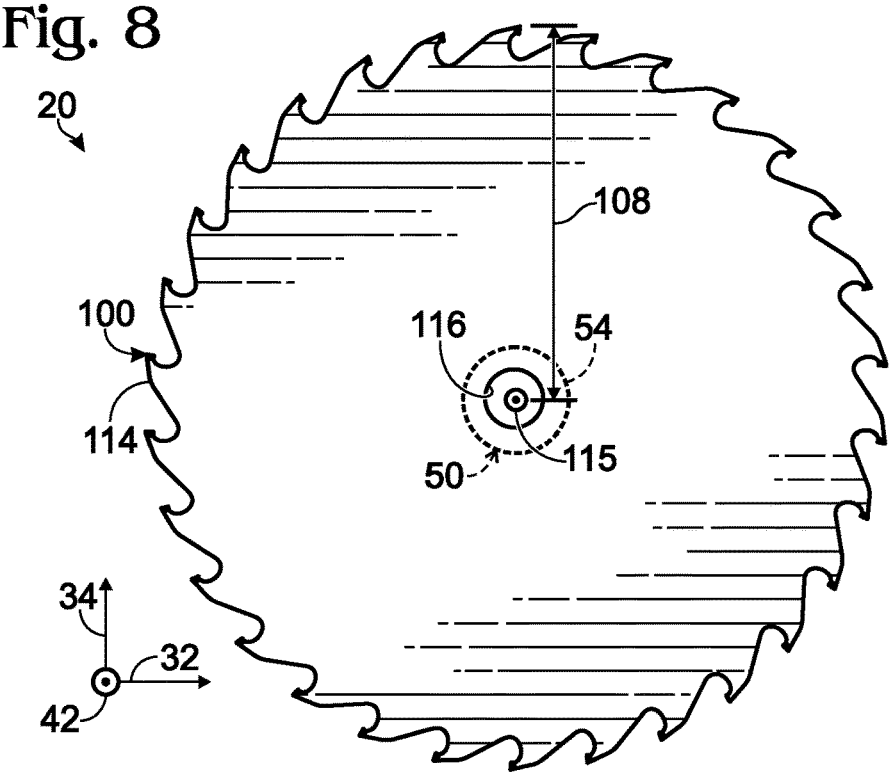
FIG. 8 is a less schematic illustration of a portion of a saw blade that may be machined utilizing the systems and methods according to the present disclosure.

As another example, and as illustrated in FIG. 8, saw blade 100 may include, or be, a circular saw blade 114 that defines an arbor hole 116. Under these conditions, blade support structure 50 may include a shaft arbor or similar projecting member 54 that extends within, and typically through, the arbor hole and/or a clamping mechanism that clamps against the sides of the circular saw blade.

As illustrated in dashed lines in FIGS. 1-2, blade milling system 20 optionally may include a blade clamp 56. Blade clamp 56 may be configured to be selectively transitioned between a clamping configuration and an unclamped configuration. When in the clamping configuration, blade clamp 56 may be configured to restrict motion of the saw blade relative to the milling head. When in the unclamped configuration, the blade clamp may permit motion of the saw blade relative to the milling head. However, this motion may be constrained to, may be within, or may be at least substantially within, end mill translation plane 46.

As perhaps illustrated most clearly in FIG. 2, working portion 102 of saw blade 100 may have and/or include a tooth-defining region 105. Blade clamp 56 may be configured to clamp the saw blade within the tooth-defining region. This may increase a rigidity of the tooth-defining region and/or may resist deflection of the tooth-defining region during milling thereof. As an example, blade clamp 56 may resist deflection of tooth-defining region in a direction that is parallel, or at least substantially parallel, to end mill rotational axis 42 when the end mill machines the saw blade to define the finished tooth profile therein.

Blade advance structure 60 may include any suitable structure that may be adapted, configured, designed, and/or constructed to selectively and/or progressively advance saw blade 100 relative to milling head 30 and/or to selectively define working portion 102 of the saw blade. Stated another way, blade advance structure 60 may include any suitable structure that positions, or precisely positions, working portion 102 of saw blade 100 relative to milling head 30. Examples of blade advance structure 60 include any suitable feed finger, indexing structure, and/or pusher.

As an example, and prior to being machined by blade milling system 20, saw blade 100 may include a plurality of rough-cut saw teeth 120, as illustrated in FIG. 2. Under these circumstances, blade advance structure 60 may be configured to operatively engage a given rough-cut saw tooth, which may define working portion 102 of the saw blade, to selectively and progressively advance the saw blade within the blade support structure. This may include operatively engaging the given rough-cut saw tooth within a region of the given rough-cut saw tooth that defines, or that will define, a tooth face of the finished tooth profile. As illustrated in dashed lines in FIGS. 1-2, blade milling system 20 also may include a sensor array 90. Sensor array 90, when present, may be configured to measure an orientation of saw blade 100, or any suitable portion thereof, relative to milling head 30 and/or end mill rotational axis 42. In addition, sensor array 90 also may be configured to generate an orientation signal 94, which may be representative of the orientation of the saw blade relative to the end mill rotational axis. When blade milling system 20 includes sensor array 90, blade milling system 20 further may include an orientation signal conductor 92. Orientation signal conductor 92 may extend between sensor array 90 and control system 80 and/or may be configured to convey the orientation signal from the sensor array to the control system.

Figure 9:
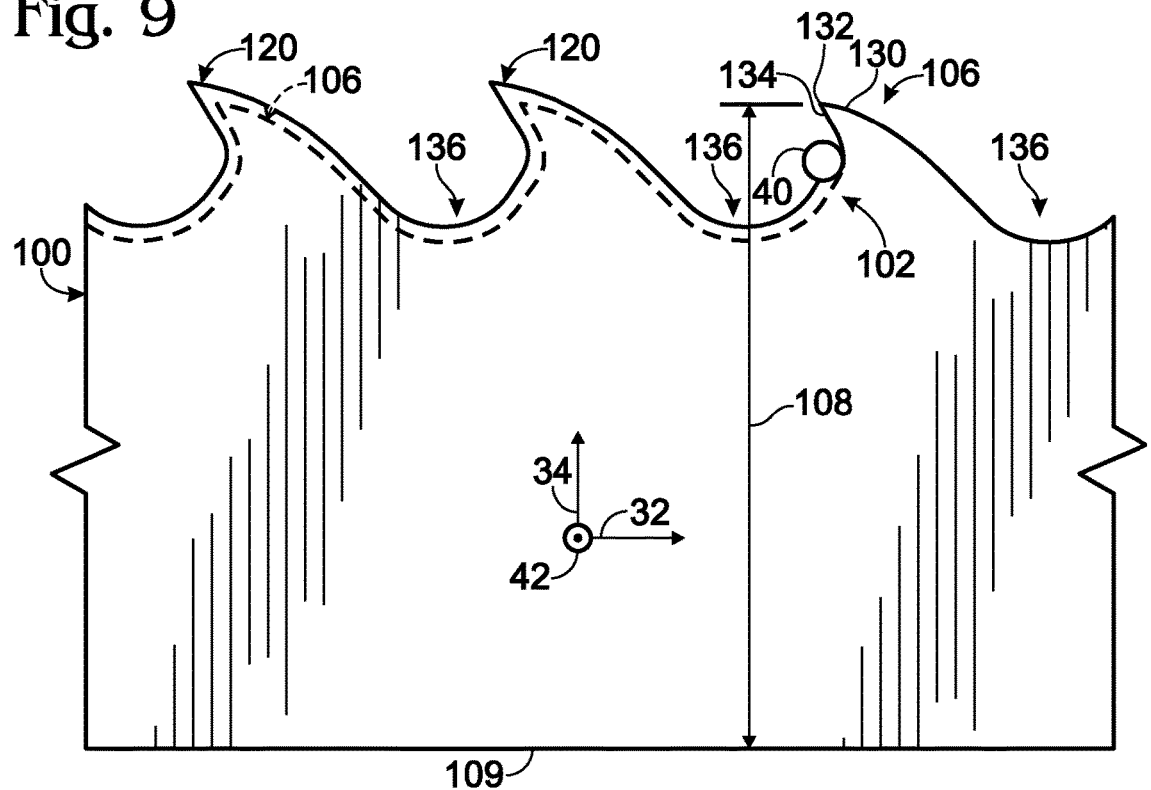
FIG. 9 is a less schematic illustration of a saw blade being milled utilizing the systems and methods according to the present disclosure.

Sensor array 90 may measure and/or determine any suitable property of saw blade 100 that may be representative of the orientation of saw blade 100 relative to end mill rotational axis 42. As an example, sensor array 90 may include a tooth height sensor 96, which may be configured to measure a tip height 108 of at least one tooth of saw blade 100, as illustrated in FIGS. 2, 9, and 12. Tip height 108 may be measured and/or determined relative to any suitable reference point, such as a blade back 109 of a bandsaw blade 110, as illustrated in FIGS. 2, 9, and 12, and/or relative to a center of mass 115 of a circular saw blade 114, as illustrated in FIG. 8. Additionally or alternatively, the reference point may be another location and/or plane, including an arbitrarily selected location and/or plane.

When sensor array 90 includes tooth height sensor 96, the tooth height sensor may measure the height of any suitable tooth. As an example, the tooth height sensor may measure the height of a previously machined tooth that has and/or defines finished tooth profile 106, as illustrated in FIGS. 2, 9, and 12.

As illustrated in dashed lines in FIGS. 1-2, blade milling system 20 also may include a blade height adjustment structure 70. Blade height adjustment structure 70, when present, may be configured to adjust a height of blade back 109 relative to end mill rotational axis 42, as illustrated in FIGS. 2, 9, and 12, and/or to adjust a height of center of mass 115 relative to the end mill rotational axis, as illustrated in FIG. 8.

It is within the scope of the present disclosure that blade height adjustment structure 70 may include, or be, an electronically controlled blade height adjustment structure. Under these conditions, and as illustrated in FIGS. 1-2, blade milling system 20 further may include a blade height adjustment conductor 72 that extends between blade height adjustment structure 70 and control system 80. Blade height adjustment conductor 72 may be configured to convey a blade height adjustment signal 74 from control system 80 to blade height adjustment structure 70 to control the operation of the blade height adjustment structure. As an example, control system 80 may be programmed to automatically adjust the height of saw blade 100 relative to end mill rotational axis 42 based, at least in part, on orientation signal 94. Adjusting the height of the saw blade may include increasing a distance between blade back 109 and end mill rotational axis 42 responsive to tip height 108 being less than a target, or threshold, tip height. Additionally or alternatively, adjusting the height of the saw blade also may include decreasing the distance between the blade back and the end mill rotational axis responsive to the tip height being greater than the target, or threshold, tip height.

Control system 80 may include any suitable structure that may be adapted, configured, designed, constructed, and/or programmed to control the operation of any suitable portion of blade milling system 20, such as blade advance structure 60 and/or milling head 30. In addition, control system 80 may be programmed to control the operation of blade milling system 20 in any suitable manner.

As an example, control system 80 may be programmed to sequentially and repeatedly control the operation of blade advance structure 60 and also to sequentially and repeatedly control the operation of milling head 30 to machine a plurality of finished tooth profiles 106 within a plurality of respective working portions 102 of saw blade 100. The plurality of finished tooth profiles may include a plurality of repeated tooth profiles and/or at least two or three different, or distinct, tooth profiles.

As illustrated by the more detailed example of FIGS. 3-6, blade milling systems 20 optionally may include one or more additional components. As an example, blade milling systems 20 may include two blade advance structures 60, with one blade advance structure 60 being configured to advance a saw blade with a left-handed tooth profile and the other blade advance structure 60 being configured to advance a saw blade with a right-handed tooth profile.

As another example, and as illustrated in FIGS. 3-4, a portion of blade support structure 50 may be contained within a portion of blade milling system 20 that includes milling head 30, while one or more additional portions of blade support structure 50 (e.g., additional blade supports) may be spaced-apart from the portion of blade milling system 20 that includes milling head 30. Under these conditions, a blade support linkage 59 may extend between the various portions of blade support structure 50, thereby permitting actuation and/or adjustment of all of the portions of blade support structure 50, as discussed in more detail herein.

As yet another example, a respective sensor array 90 may be located on each side of milling head 30. Such a configuration may permit blade milling systems 20 to measure and/or monitor the tooth height both before and after milling of the finished tooth profile by end mill 40. Additionally or alternatively, one sensor array 90 may be utilized to monitor the tooth height of the finished tooth profile for a saw blade with a right-handed tooth profile, while the other sensor array 90 may be utilized to monitor the tooth height of the finished tooth profile for a saw blade with a left-handed tooth profile.

As another example, blade milling systems 20 may include one or more manual actuators, or handles, 160. Manual actuators 160 may be utilized to manually adjust the orientation of various components of the blade milling systems. As an example, a manual blade height adjustment actuator 162 may be utilized to adjust the height of saw blade 100 within blade support structure 50. As another example, a manual blade advance structure actuator 164 may be utilized to adjust an orientation of blade advance structures 60 relative to blade 100. As yet another example, blade milling systems 20 may include one or more air cylinders 166, as illustrated in FIG. 5, which may be utilized to actuate blade advance structure 60. As another example, a linear measurement device 168, as illustrated in FIGS. 5-6, may measure displacement and/or motion of blade advance structure 60.

An example of a saw blade 100 that may be machined utilizing the systems and methods disclosed herein is illustrated in FIG. 9. As illustrated therein, and prior to being machined, saw blade 100 may include a plurality of rough-cut saw teeth 120 that may be machined to produce and/or generate a finished tooth profile 106, which is illustrated in solid lines on the rightmost tooth of FIG. 9 and in dashed lines on the central and leftmost teeth of FIG. 9.

As illustrated, finished tooth profile 106 may be defined between a gullet 136 of a prior tooth (e.g., the rightmost gullet 136 of FIG. 9) and a gullet 136 of the finished tooth profile (e.g., the second gullet 136 from the right in FIG. 9). With this in mind, control system 80 may be programmed to operatively and concurrently translate the milling head and/or end mill 40 in both a first translational direction (e.g., along first translational axis 32) and in a second translational direction (e.g., along second translational axis 34) such that the end mill initiates machining of working portion 102 of saw blade 100 within the gullet of the prior tooth and terminates machining of the working portion of the saw blade within the gullet of the finished tooth profile. Additionally or alternatively, control system 80 may be programmed to operatively and concurrently translate the milling head and/or end mill 40 such that the end mill initiates machining of working portion 102 of saw blade 100 within the gullet of the finished tooth profile and terminates machining of the working portion of the saw blade within the gullet of the prior tooth.

In the example of FIG. 9, this may include moving end mill 40 from the gullet of the prior tooth, along a tooth back 130 of finished tooth profile 106, around a tooth tip 132 of the finished tooth profile, along a tooth face 134 of the finished tooth profile, and into the gullet 136 of the finished tooth profile. Such a procedure may ensure an accurate, controlled, and/or known tip height 108 of the finished tooth profile and/or may improve tooth-to-tooth tip height uniformity when compared to prior art mechanisms for forming the teeth. Stated another way, control system 80 may be programmed to control the operation of blade milling system 20 to sequentially mill tooth back 130, tooth tip 132, tooth face 134, and tooth gullet 136 of finished tooth profile 106. Additionally or alternatively, control system 80 may be programmed to initiate machining of the working portion of the saw blade in a region of the saw blade other than tooth face 134 of finished tooth profile 106. It is within the scope of the present disclosure that control system 80 may be programmed to maintain continuous contact between end mill 40 and saw blade 100 during milling of finished tooth profile 106; however, this is not required.

Control system 80 additionally or alternatively may be programmed to control the operation of blade milling system 20 via and/or utilizing any suitable method, such as methods 200 of FIG. 13. Control system 80 additionally or alternatively may be programmed to form and/or define any suitable saw blade, such as saw blade 100 of any of FIG. 1-6, 8-9 or 12.

As an example, and as discussed in more detail herein with reference to FIG. 12, control system 80 may be programmed to mill a relief region 138 within saw blade 100. Relief region 138 may be defined between a tooth face 134 of finished tooth profile 106 and a tooth gullet 136 of the finished tooth profile. As illustrated, relief region 138 may extend from tooth face 134 and toward tooth back 130 of the finished tooth profile. When control system 80 controls blade milling system 20 to mill relief region 138, blade milling system 20 may mill the relief region subsequent to milling tooth face 134 and prior to milling tooth gullet 136 of the finished tooth profile. Additionally or alternatively, blade milling system 20 may be described as, and/or may be described as being programmed to, sequentially mill tooth face 134, relief region 138, and tooth gullet 136 of a given tooth in a single pass and/or a single sequential operation.

End mill 40 may include and/or be any suitable end mill that may be utilized to machine and/or mill saw blade 100, such as to produce finished tooth profile 106 therein. As an example, end mill 40 may be a titanium aluminum nitride-coated end mill.

Figure 10:
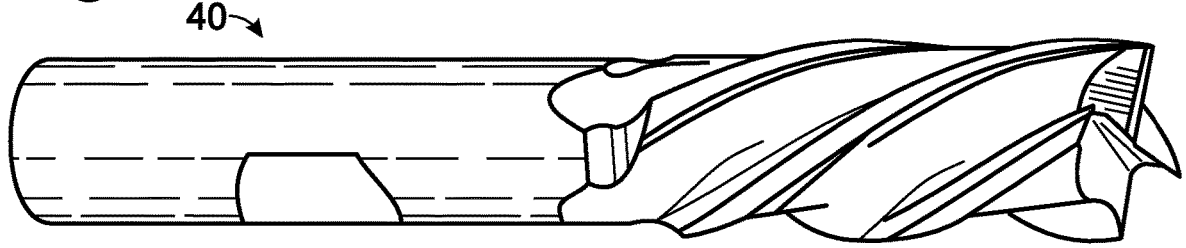
FIG. 10 is an illustration of a left-hand cut, left-hand spiral end mill that may be utilized with the systems and methods according to the present disclosure.
Figure 11:
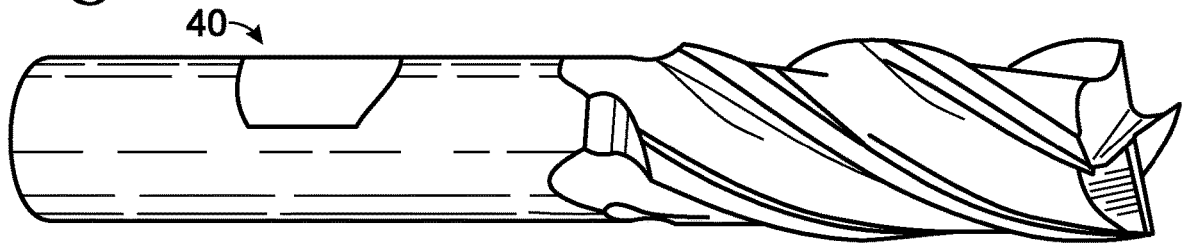
FIG. 11 is an illustration of a right-hand cut, right-hand spiral end mill that may be utilized with the systems and methods according to the present disclosure.

As another example, and when finished tooth profile 106 includes a right-handed tooth profile, end mill 40 may be a left-hand cut, left-hand spiral end mill, as illustrated in FIG. 10. Alternatively, and when finished tooth profile 106 includes a left-handed tooth profile, end mill 40 may be a right-hand cut, right-hand spiral end mill, as illustrated in FIG. 11. Although not required, such an end mill configuration may improve burr clearing at tooth tip 132, thereby improving the performance of finished tooth profile 106.

FIG. 12 is a less schematic illustration of a saw blade 100, such as saw blade 100 of FIGS. 1-6, and 8-9, that may be machined utilizing the blade milling systems and methods according to the present disclosure. Saw blade 100 of FIG. 12 includes a blade body 104 and a plurality of teeth 107. Teeth 107 are defined by blade body 104 and may form, define, and/or have a finished tooth profile 106.

Each tooth 107 includes a tooth back 130, a tooth tip 132, a tooth face 134, and a tooth gullet 136. In addition, at least one tooth 107, optionally a plurality of teeth 107 (such as every $n^{th}$ ($2^{nd}$, $3^{rd}$, $4^{th}$, etc.) tooth of the plurality of teeth), and further optionally every tooth 107, may include a relief region 138. Relief region 138 extends, within the at least one tooth 107, toward tooth back 130 from tooth face 134 and/or from tooth gullet 136.

Teeth 107, such as tooth back 130, tooth tip 132, tooth face 134, and/or tooth gullet 136, additionally or alternatively may be referred to herein as having, or as being defined by, at least one arc, at least one angle, at least one radius, at least one radius of curvature, at least one arcuate region, and/or at least one planar region. As an example, tooth back 130 may have and/or may be defined by one or more of an exit angle, a back radius, and/or a back angle. As another example, tooth tip 132 may have and/or may be defined by an intersection between the back angle and a hook angle. As yet another example, tooth face 134 may have and/or may be defined by one or more of the hook angle, a first angle, and/or a second angle. As another example, tooth gullet 136 may have and/or may be defined by one or more of the first angle, the second angle, a third angle, and/or the exit angle.

As used herein, the phrase "finished tooth profile" is intended to convey that the tooth, as defined by the blade body of the saw blade, has a finished, or at least substantially finished, shape, or profile, at least to the extent that the tooth profile is defined by the blade milling system. However, it is within the scope of the present disclosure that one or more additional processing operations still may be performed on the finished tooth profile. As an example, at least a portion of the finished tooth profile may be polished subsequent to milling of the finished tooth profile. As another example, one or more tip inserts 150 may be operatively attached to the finished tooth profile. Examples of tip inserts 150 may include hardened inserts, such as carbide inserts, that may be operatively attached to the finished tooth profile via welding, brazing, and the like.

Alternatively, the rough-cut saw teeth may be swaged and subsequently sharpened, such as via and/or utilizing blade milling systems 20. As an example, the finished tooth profile, which is formed via and/or utilizing blade milling systems 20, may be swaged and subsequently sharpened. As another example, and when the rough-cut saw teeth are formed utilizing an operation, such as water jet cutting, that does not form the heat affected zone, the rough-cut saw teeth may be swaged prior to the finished tooth profile being defined therein. Such a finished and swaged tooth profile may be flatter, may be sharper, and/or may have a smoother finish than a finished and swaged tooth profile that may be generated by a grinding operation.

Relief region 138, when present, also may be referred to herein as an undercut region 138 and may have and/or define any suitable shape. As an example, tooth face 134 may be a planar, or at least substantially planar, tooth face 134 that extends within a tooth face plane. Under these conditions, relief region 138 may extend away from the tooth face plane and/or toward tooth back 130 of the tooth. As another example, relief region 138 may be an arcuate relief region and/or may define an arcuate shape. As yet another example, relief region 138 may extend between, or spatially separate, tooth face 134 and tooth gullet 136. As another example, relief region 138 may have a smaller radius of curvature than tooth gullet 136. As yet another example, relief region 138 may define a transition region between tooth face 134 and tooth gullet 136. As another example, and when relief region 138 is present within finished tooth profile 106, the finished tooth profile may define one or more shoulders, or edges, 139, which may extend between tooth face 134 and relief region 138 and/or between relief region 138 and tooth gullet 136.

In general, it may not be feasible, or at least economically feasible, to form and/or define a relief region within a saw blade utilizing prior art systems for forming finished tooth profiles, such as grinding operations. This may be due to the large size of a grinding wheel relative to the size of the various portions of the teeth and/or to inherent limitations associated with the systems that are utilized in the grinding operations. However, the systems and methods disclosed herein readily may be utilized to define relief regions 138. This may be due to the much smaller size of end mill 40, as illustrated in FIGS. 1-6, when compared to the size of a grinding wheel, to the ability of end mill 40 to translate within end mill translation plane 46, and/or to the rotation of end mill 40 about end mill rotational axis 42 that is perpendicular to working portion 102 of saw blade 100.

Saw blades 100 disclosed herein that include relief regions 138 may provide benefits over prior art saw blades that do not include the relief regions. As an example, it may be more economical to sharpen saw blades 100 that include relief regions 138, and these saw blades may be sharpened, or resharpened, multiple times, such as until the relief region is no longer present, without the need to re-grind a remainder of the saw blade. Stated another way, saw blades 100 that include relief regions 138 may be resharpened simply by dressing tooth face 134 and/or tooth tip 132. In contrast, resharpening of prior art saw blades also requires dressing of at least gullet 136 as well.

As discussed, saw blade 100 may include, or be, a bandsaw blade 110. Under these conditions, the bandsaw blade may have, or define, any suitable thickness. As examples, the bandsaw blade may have a thickness of at least 1 millimeter (mm), at least 1.25 mm, at least 1.5 mm, at least 1.75 mm, at least 2 mm, at least 2.25 mm, and/or at least 2.5 mm. Additionally or alternatively, the thickness may be at most 4 mm, at most 3.75 mm, at most 3.5 mm, at most 3.25 mm, at most 3 mm, at most 2.75 mm, at most 2.5 mm, at most 2.25 mm, or at most 2 mm.

Bandsaw blade 110 also may have, or define, any suitable height, which also may be referred to herein as tip height 108. As examples, the height may be at least 5 centimeters (cm), at least 7.5 cm, at least 10 cm, at least 15 cm, at least 20 cm, at least 25 cm, at least 30 cm, at least 35 cm, and/or at least 40 cm. Additionally or alternatively, the height may be at most 50 cm, at most 45 cm, at most 40 cm, at most 35 cm, and/or at most 30 cm.

Bandsaw blade 110 also may have, or define, any suitable length, which may be measured about perimeter 112 thereof. As examples, the length may be at least 2 meters (m), at least 5 m, at least 7.5 m, at least 10 m, at least 15 m, or at least 20 m. Additionally or alternatively, the length may be at most 40 m, at most 35 m, at most 30 m, at most 25 m, or at most 20 m.

Saw blade 100, whether it be a bandsaw blade 110 or circular saw blade 114 of FIG. 8, may be adapted, configured, designed, and/or constructed to cut wood and/or may be referred to herein as a wood-cutting saw blade 100. With this in mind, saw blade 100 may have an average tooth pitch 140 (as illustrated in FIG. 12), or spacing between adjacent tooth tips, of at least 0.5 cm, at least 0.75 cm, at least 1 cm, at least 1.5 cm, at least 2 cm, at least 2.5 cm, and/or at least 3 cm. Additionally or alternatively, the average tooth pitch may be at most 16 cm, at most 14 cm, at most 12 cm, at most 10 cm, at most 8 cm, at most 6 cm, at most 5 cm, at most 4.5 cm, at most 4 cm, at most 3.5 cm, at most 3 cm, at most 2.5 cm, at most 2 cm, at most 1.5 cm, and/or at most 1 cm.

Saw blade 100 also may have and/or define an average gullet depth 142 (as illustrated in FIG. 12) of at least 0.25 cm, at least 0.5 cm, at least 0.75 cm, at least 1 cm, at least 1.5 cm, at least 2 cm, and/or at least 2.5 cm. Additionally or alternatively, the average gullet depth may be at most 8 cm, at most 6 cm, at most 5 cm, at most 4.5 cm, at most 4 cm, at most 3.5 cm, at most 3 cm, at most 2.5 cm, at most 2 cm, at most 1.5 cm, and/or at most 1 cm.

FIG. 13 is a flowchart depicting methods 200, according to the present disclosure, of machining a saw blade tooth profile of a saw blade with a blade milling system, such as blade milling system 20 of FIGS. 1-6. Methods 200 include supporting the saw blade at 210 and may include determining a reference height at 220. Methods 200 also include advancing the saw blade at 230, may include clamping the saw blade at 240, and include machining a finished tooth profile in the saw blade at 250. Methods 200 further may include monitoring a tip height of a tooth tip at 260, adjusting a location of a working portion of the saw blade at 270, repeating at least a portion of the methods at 280, and/or attaching a tip insert at 290.

Supporting the saw blade at 210 may include supporting the saw blade such that a side of the saw blade extends perpendicular, or at least substantially perpendicular, to an end mill rotational axis of an end mill of the blade milling system. This may include supporting via and/or utilizing a blade support structure, such as blade support structure 50 of FIGS. 1-8. The saw blade may be a bandsaw blade that defines a bandsaw blade length. Under these conditions, the supporting at 210 may include supporting along, or along an entirety of, the bandsaw blade length, such as via and/or utilizing a plurality of bandsaw-contacting structures. Examples of the bandsaw-contacting structures are disclosed herein with reference to bandsaw-contacting structures 52 of FIGS. 1-4.

Determining the reference height at 220 may include determining any suitable reference height, such as may be utilized during the machining at 250. As an example, the determining at 220 may include determining a height of one or more rough-cut saw teeth of a plurality of rough-cut saw teeth that is defined within the saw blade. As another example, the determining at 220 may include determining an average height of the rough-cut saw teeth, determining a maximum height of the rough-cut saw teeth, and/or determining a minimum height of the rough-cut saw teeth.

Advancing the saw blade at 230 may include advancing such that a target portion of the saw blade defines the working portion of the saw blade. This may include advancing via and/or utilizing a blade advance structure, such as blade advance structure 60 of FIGS. 1-6. As discussed herein, and prior to the machining at 250, the bandsaw blade may include a plurality of rough-cut saw teeth. Under these conditions, the advancing at 230 may include operatively engaging a given rough-cut saw tooth, or a rough-cut tooth face of the given rough-cut saw tooth, to operatively translate the saw blade within the blade support structure.

Clamping the saw blade at 240 may include clamping the saw blade to restrict motion of the saw blade utilizing any suitable structure, such as blade clamp 56 of FIGS. 1-2. This may include restricting motion of the saw blade during the machining at 250, restricting motion of the saw blade relative the blade support structure during the machining at 250, restricting motion of the saw blade relative to the blade advance structure during the machining at 250, and/or restricting motion of the saw blade relative to a milling head of the blade milling system during the machining at 250.

Machining the finished tooth profile in the saw blade at 250 may include machining the finished tooth profile in the working portion of the saw blade and/or machining with the end mill. This may include operatively translating the end mill, such as end mill 40 of FIGS. 1-6 and 10-11, relative to the saw blade with the milling head, such as milling head 30 of FIGS. 1-6, and/or operatively translating the end mill in a plane that is perpendicular, or at least substantially perpendicular, to the end mill rotational axis, such as end mill translation plane 46 of FIGS. 1, 3, and 5.

It is within the scope of the present disclosure that the machining at 250 may include rotating the end mill about the end mill rotational axis with the milling head. When methods 200 are utilized to machine a right-handed tooth profile in the saw blade, the end mill may include a left-hand cut, left-hand spiral end mill, and the rotating may include rotating the end mill in a counterclockwise direction, as viewed from the milling head. Alternatively, and when methods 200 are utilized to machine a left-handed tooth profile in the saw blade, the end mill may include a right-hand cut, right-hand spiral end mill, and the rotating may include rotating the end mill in a clockwise direction, as viewed from the milling head. Such a relationship between the handedness of the saw blade, the construction of the end mill, and the rotation of the end mill may improve burr clearing at a tooth tip during machining of the finished tooth profile.

The machining at 250 also may include oscillating the end mill along the end mill rotational axis. Such oscillation may permit the blade milling system to utilize an entirety of a cutting edge of the end mill, may decrease wear of the end mill, and/or may provide a more uniform finished tooth profile.

When methods 200 include the determining at 220, the machining at 250 may be based, at least in part, on the reference height determined during the determining at 220. As an example, the reference height may be utilized to establish a tool path for the end mill, which will be utilized during the machining at 250, that will remove a target amount of material from the saw blade. As a more specific example, and when the determining at 220 includes determining the height of one or more rough-cut saw teeth, the height of the one or more rough-cut saw teeth may be utilized to establish a tool path for the end mill that will define a tip height of the finished tooth profile that is target amount, or magnitude, less than the height of the one or more rough-cut saw teeth.

The machining at 250 may be accomplished in any suitable manner. As an example, the machining at 250 may include machining a tooth back of the finished tooth profile at 251, machining a tooth tip of the finished tooth profile at 252, machining a tooth face of the finished tooth profile at 253, machining a relief region of the finished tooth profile at 254, and/or machining a tooth gullet of the finished tooth profile at 255. The machining at 251, the machining at 252, the machining at 253, the machining at 254, and/or the machining at 255 generally will be performed sequentially. As an example, the machining at 251 may be performed prior to the machining at 252, which may be performed prior to the machining at 253, which may be performed prior to the machining at 254 (when performed), which may be performed prior to the machining at 255. Additionally or alternatively, the machining at 255 may be performed prior to the machining at 254 (when performed), which may be performed prior to the machining at 253, which may be performed prior to the machining at 252, which may be performed prior to the machining at 251.

The machining at 250 may include utilizing a continuous motion of the end mill while performing at least the machining at 251, the machining at 252, the machining at 253, and the machining at 255 and/or machining an entirety of the finished tooth profile in a single pass of the end mill. Prior to the machining at 251, the machining at 250 may include initiating the machining at 250 within a tooth gullet of an adjacent tooth, which is adjacent to the finished tooth profile.

The machining the tooth back of the finished tooth profile at 251 may include operatively translating, or concurrently and operatively translating, the end mill in a first direction, which is perpendicular to the end mill rotational axis, and also in a second direction, which is perpendicular to the first direction and to the end mill rotational axis. Stated another way, the first direction and the second direction both may extend within the end mill translation plane, and/or the machining at 251 may include machining an arcuate, or at least partially arcuate, tooth back.

The machining at 251 may be performed with any suitable timing and/or sequence within methods 200 and/or during the machining at 250. As an example, the machining at 251 may be performed prior to the machining at 252.

The machining the tooth tip of the finished tooth profile at 252 and the machining the tooth face of the finished tooth profile at 253 may include operatively translating, or concurrently and operatively translating, the end mill in a third direction, which is opposed to the first direction, and also in a fourth direction, which is opposed to the second direction. This may include machining an arcuate, or at least partially arcuate, tooth face during the machining at 253 and/or machining a linear, or at least partially linear, tooth face during the machining at 253.

The machining at 252 and the machining at 253 may be performed with any suitable timing and/or sequence within methods 200 and/or during the machining at 250. As an example, the machining at 252 may be performed subsequent to the machining at 251. As another example, the machining at 253 may be performed subsequent to the machining at 252.

The machining the relief region of the finished tooth profile at 254 may include machining a relief region that extends toward the tooth back of the finished tooth profile from the tooth face of the finished tooth profile and/or from the tooth gullet of the finished tooth profile. This may include operatively translating, or concurrently and operatively translating, the end mill in the third direction and/or in the fourth direction. Additionally or alternatively, the machining at 253 may include operatively translating the end mill in a straight, or at least substantially straight, line, and the machining at 254 may include operatively translating the end mill away from the straight, or at least substantially straight, line and toward the tooth back of the finished tooth profile. The machining at 254 may include utilizing a continuous, or at least substantially continuous, motion of the end mill to transition from the machining at 253 to the machining at 254 and/or to transition from the machining at 254 to the machining at 255.

The machining at 254 may be performed with any suitable timing and/or sequence within methods 200 and/or during the machining at 250. As examples, the machining at 254 may be performed subsequent to the machining at 252, subsequent to the machining at 253, and/or prior to the machining at 255.

The machining the tooth gullet of the finished tooth profile at 255 may include operatively translating, or concurrently and operatively translating, the end mill in the first direction and also in the fourth direction. This may include machining an arcuate, or at least partially arcuate, tooth gullet during the machining at 255.

The machining at 255 may be performed with any suitable timing and/or sequence within methods 200 and/or during the machining at 250. As examples, the machining at 255 may be performed subsequent to the machining at 253 and/or subsequent to the machining at 254. It is within the scope of the present disclosure that the machining at 250 may include dry-machining the finished tooth profile. Stated another way, the machining at 250 may include machining the finished tooth profile without the use of, or without utilizing, a liquid lubricant to lubricate an interface between the end mill and the saw blade and/or without utilizing a liquid coolant to cool the interface between the end mill and the saw blade. As examples, the machining at 250 may include machining without utilizing the liquid coolant to cool a cutting edge of the end mill, without utilizing the liquid lubricant to lubricate the cutting edge of the end mill, without utilizing the liquid coolant to cool the saw blade, and/or without utilizing the liquid lubricant to lubricate the saw blade.

Monitoring the tip height of the tooth tip at 260 may include monitoring the tip height of the tooth tip of the finished tooth profile. Examples of the tip height of the finished tooth profile are disclosed herein with reference to tip height 108 of FIGS. 2, 8-9, and 12. The monitoring at 260 may be performed with any suitable timing and/or sequence during methods 200. As an example, the monitoring at 260 may include monitoring subsequent to the machining at 250.

The monitoring at 260 also may be performed utilizing any suitable sensor array, such as sensor array 90 of FIGS. 1-6. The monitoring at 260 may be utilized for quality control, such as to monitor for a bent tooth of the saw blade and/or to monitor a kerf width of the saw blade. Additionally or alternatively, the monitoring at 260 may include monitoring a uniformity of tip height produced during the machining at 250. Under these conditions, and when the monitoring at 260 indicates more than a threshold height variation among the tip heights of the finished tooth profiles, at least a portion of the saw blade may be reworked, or re-machined, such as during the repeating at 280.

When methods 200 include the monitoring at 260, methods 200 also may include the adjusting the location of the working portion of the saw blade at 270. The adjusting at 270 may include adjusting within the plane that is perpendicular, or at least substantially perpendicular, to the end mill rotational axis (e.g., the end mill translation plane) and may be based, at least in part, on the monitored tip height as determined during the monitoring at 260.

The adjusting at 270 may include adjusting in any suitable manner. As an example, the adjusting at 270 may include adjusting to maintain the tip height at a desired tip height and/or adjusting with a height adjustment structure, such as height adjustment structure 70 of FIGS. 1-2. As another example, the adjusting at 270 may include operatively translating a blade back of the saw blade in a vertical direction with the height adjustment structure. As additional examples, the adjusting at 270 may include operatively translating the blade back toward the end mill rotational axis to decrease the tip height and/or operatively translating the blade back away from the end mill rotational axis to increase the tip height.

It is within the scope of the present disclosure that the working portion of the saw blade may be a first working portion of the saw blade of a plurality of working portions of the saw blade and that the finished tooth profile may be a first finished tooth profile of a plurality of finished tooth profiles. Under these conditions, methods 200 may include repeating at least the portion of the methods, at 280, to machine a second, or subsequent, finished tooth profile within a second, or subsequent, working portion of the saw blade. The second working portion of the saw blade may be spaced-apart, or different, from the first working portion of the saw blade.

The repeating at 280 may include repeating at least the advancing at 230 and the machining at 250 and also may include repeating other steps of methods 200. The repeating at 280 additionally or alternatively may include machining an entirety of the first finished tooth profile prior to initiating machining of the second finished tooth profile.

The first finished tooth profile may be similar, or even identical, to the second finished tooth profile. Alternatively, the first finished tooth profile may differ from the second finished tooth profile in at least one respect. As examples, a tip height of the first finished tooth profile may differ from a tip height of the second finished tooth profile, a tooth shape of the first finished tooth profile may differ from a tooth shape of the second finished tooth profile, and/or a tooth pitch of the first finished tooth profile may differ from a tooth pitch of the second finished tooth profile.

Attaching the tip insert at 290 may include attaching any suitable tip insert to the finished tooth profile and generally will be performed subsequent to the repeating at 280. However, this is not required, and it is within the scope of the present disclosure that the attaching at 290 may be performed concurrently, or at least partially concurrently, with the repeating at 280, such as when the attaching at 290 is performed on a given finished tooth profile of a given tooth of the saw blade while another finished tooth profile is being milled in another tooth of the saw blade.

The attaching at 290 may include attaching any suitable tooth insert in any suitable manner. As examples, the attaching at 290 may include brazing and/or welding a carbide insert to the finished tooth profile.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of blade milling systems, saw blades, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A blade milling system for machining tooth profiles in a saw blade, the blade milling system comprising:

a milling head configured to rotate an end mill about an end mill rotational axis and to operatively translate the end mill within an end mill translation plane that is perpendicular, or at least substantially perpendicular, to the end mill rotational axis;

a blade support structure configured to operatively support the saw blade, relative to the milling head, such that a working portion of the saw blade extends within the end mill translation plane;

a blade advance structure configured to selectively and progressively advance the saw blade, relative to the milling head, to selectively define the working portion of the saw blade; and a control system programmed to:
  (i) control the operation of the blade advance structure to operatively position the saw blade, relative to the milling head, such that a target portion of the saw blade defines the working portion of the saw blade; and
  (ii) control the operation of the milling head to operatively translate the milling head such that the end mill translates within the end mill translation plane and machines the working portion of the saw blade to define a finished tooth profile within the working portion of the saw blade.

A2. The system of paragraph A1, wherein the milling head includes a spindle and a tool holder that grips the end mill and is operatively attached to the spindle, wherein the spindle rotates to rotate the end mill about the end mill rotational axis.

A3. The system of paragraph A2, wherein the milling head includes an oscillation structure configured to oscillate the end mill along the end mill rotational axis during rotation of the end mill about the end mill rotational axis.

A4. The system of any of paragraphs A1-A3, wherein the milling head includes a translation stage configured to operatively translate the end mill within the end mill translation plane.

A5. The system of paragraph A4, wherein the translation stage is an electronically controlled translation stage.

A6. The system of any of paragraphs A1-A5, wherein the system includes a milling head control conductor extending between the milling head and the control system.

A7. The system of paragraph A6, wherein the milling head control conductor is configured to at least one of:
  convey a milling head control signal from the control system to the milling head; and
  (ii) convey a milling head status signal from the milling head to the control system.

A8. The system of any of paragraphs A1-A7, wherein the milling head is configured to operatively translate, and optionally to concurrently and operatively translate, the end mill along a first translational axis, which extends within the end mill translation plane, and also along a second translational axis, which extends within the end mill translation plane and is perpendicular, or at least substantially perpendicular, to the first translational axis.

A9. The system of any of paragraphs A1-A8, wherein the saw blade is a bandsaw blade that defines a blade length as measured about a perimeter thereof, and further wherein the blade support structure includes a plurality of bandsaw-contacting structures configured to support the bandsaw blade, and optionally to support an entirety of the blade length of the bandsaw blade.

A10. The system of paragraph A9, wherein the plurality of bandsaw-contacting structures includes a plurality of rollers.

A11. The system of any of paragraphs A1-A10, wherein the saw blade is a circular saw blade including an arbor hole, and further wherein the blade support structure includes a shaft arbor that extends within the arbor hole.

A12. The system of any of paragraphs A1-A11, wherein the system further includes a blade clamp configured to be selectively transitioned between a clamping configuration, in which the blade clamp restricts motion of the saw blade relative to the milling head, and an unclamped configuration, in which the blade clamp permits motion of the saw blade relative to the milling head and within, or at least substantially within, the end mill translation plane.

A13. The system of paragraph A12, wherein the working portion of the saw blade includes a tooth-defining region, and further wherein the blade clamp is configured to clamp the saw blade, within the tooth-defining region, to resist deflection of the tooth-defining region, optionally in a direction that is parallel to the end mill rotational axis, when the end mill machines the saw blade to define the finished tooth profile.

A14. The system of any of paragraphs A1-A13, wherein, prior to being machined by the blade milling system, the saw blade includes a plurality of rough-cut saw teeth, and further wherein the blade advance structure is configured to operatively engage a given rough-cut saw tooth of the plurality of rough-cut saw teeth to selectively and progressively advance the saw blade within the blade support structure.

A15. The system of paragraph A14, wherein the given rough-cut saw tooth defines the working portion of the saw blade.

A16. The system of any of paragraphs A14-A15, wherein the blade advance structure is configured to operatively engage the given rough-cut saw tooth within a region of the given rough-cut saw tooth that will define a tooth face of the finished tooth profile.

A17. The system of any of paragraphs A1-A16, wherein the blade advance structure includes at least one of a feed finger, an indexing structure, and a pusher.

A18. The system of any of paragraphs A1-A17, wherein the blade advance structure precisely positions the working portion of the saw blade relative to the milling head.

A19. The system of any of paragraphs A1-A18, wherein the system further includes a sensor array configured to generate an orientation signal representative of an orientation of the saw blade relative to the end mill rotational axis.

A20. The system of paragraph A19, wherein the system further includes an orientation signal conductor configured to convey the orientation signal to the control system.

A21. The system of any of paragraphs A19-A20, wherein the sensor array includes a tooth height sensor configured to measure a tip height of at least one tooth of the saw blade.

A22. The system of paragraph A21, wherein the tip height is measured relative to a blade back of the saw blade.

A23. The system of any of paragraphs A21-A22, wherein the tip height is measured relative to a center of mass of the saw blade.

A24. The system of any of paragraphs A21-A23, wherein the at least one tooth of the saw blade includes a previously machined tooth of the saw blade.

A25. The system of any of paragraphs A21-A24, wherein the system further includes a blade height adjustment structure configured to adjust a height of the saw blade relative to the end mill rotational axis.

A26. The system of paragraph A25, wherein the blade height adjustment structure is an electronically controlled blade height adjustment structure, wherein the system further includes a blade height adjustment conductor that extends between the blade height adjustment structure and the control system and is configured to convey a blade height adjustment signal from the control system to the blade height adjustment structure.

A27. The system of paragraph A26, wherein the control system is programmed to automatically adjust the height of the saw blade relative to the end mill rotational axis via the blade height adjustment signal and based, at least in part, on the orientation signal.

A28. The system of any of paragraphs A1-A27, wherein the control system is programmed to sequentially and repeatedly control the operation of the blade advance structure and operatively translate the milling head to machine a plurality of finished tooth profiles within a plurality of respective working portions of the saw blade.

A29. The system of paragraph A28, wherein the plurality of finished tooth profiles includes a plurality of repeated tooth profiles.

A30. The system of any of paragraphs A28-A29, wherein the plurality of finished tooth profiles includes at least two different tooth profiles.

A31. The system of any of paragraphs A1-A30, wherein the finished tooth profile is defined between a gullet of a prior tooth and a gullet of the finished tooth profile, and further wherein the control system is programmed to operatively and concurrently translate the milling head in both a first translational direction and a second translational direction such that the end mill initiates machining of the working portion of the saw blade within the gullet of the prior tooth and terminates machining of the working portion of the saw blade within the gullet of the finished tooth profile.

A32. The system of any of paragraphs A1-A31, wherein the control system is programmed to initiate machining of the working portion of the saw blade in a region other than a tooth face of the finished tooth profile.

A33. The system of any of paragraphs A1-A32, wherein the control system is programmed to sequentially mill a tooth back of the finished tooth profile, a tooth tip of the finished tooth profile, and a tooth face of the finished tooth profile.

A34. The system of any of paragraphs A1-A33, wherein the control system is programmed to maintain continuous contact between the end mill and the saw blade during milling of the finished tooth profile.

A35. The system of any of paragraphs A1-A34, wherein the control system is programmed to perform the method of any of paragraphs C1-D19.

A36. The system of any of paragraphs A1-A35, wherein the control system is programmed to utilize the method of any of paragraphs C1-C47 or D1-D19 to produce the saw blade of any of paragraphs B1-B12.

A37. The system of any of paragraphs A1-A36, wherein the control system is programmed to utilize the milling head to form the saw blade of any of paragraphs B1-B12.

A38. The system of any of paragraphs A1-A37, wherein the control system is programmed to mill a relief region between a/the tooth face of the finished tooth profile and a tooth gullet of the finished tooth profile.

A39. The system of paragraph A38, wherein the relief region extends, from the tooth face of the finished tooth profile, toward a tooth back of the finished tooth profile.

A40. The system of any of paragraphs A38-A39, wherein the control system is programmed to mill the relief region subsequent to milling the tooth face of the finished tooth profile and prior to milling the tooth gullet of the finished tooth profile.

A41. The system of any of paragraphs A1-A40, wherein the blade milling system includes the end mill.

A42. The system of any of paragraphs A1-A41, wherein the finished tooth profile includes a right-handed tooth profile, and further wherein the end mill includes a left-hand cut, left-hand spiral end mill.

A43. The system of any of paragraphs A1-A42, wherein the finished tooth profile includes a left-handed tooth profile, and further wherein the end mill includes a right-hand cut, right-hand spiral end mill.

A44. The system of any of paragraphs A1-A43, wherein the end mill is a titanium aluminum nitride-coated end mill.

A45. The system of any of paragraphs A1-A44, wherein the system includes the saw blade of any of paragraphs B1-B13.

A46. The system of any of paragraphs A1-A45, wherein the tooth profiles are cutting tooth profiles.

A47. A saw blade produced by the system of any of paragraphs A1-A46.

A48. The saw blade of paragraph A47, wherein the saw blade is a bandsaw blade.

A49. The saw blade of paragraph A47, wherein the saw blade is a circular saw blade.

A50. The saw blade of any of paragraphs A47-A49, wherein the saw blade is a wood-cutting saw blade.

B1. A saw blade, comprising:
a blade body; and
a plurality of teeth defined by the blade body, wherein:
(i) each tooth in the plurality of teeth includes a tooth back, a tooth tip, a tooth face, and a tooth gullet; and
(ii) optionally, a relief region extends, in at least one tooth of the plurality of teeth, toward the tooth back and separates the tooth face from the tooth gullet.

B2. The saw blade of paragraph B1, wherein the tooth face is a planar, or at least substantially planar, tooth face that extends within a tooth face plane, and further wherein the relief region extends away from the tooth face plane and toward the tooth back.

B3. The saw blade of any of paragraphs B1-B2, wherein the relief region is an arcuate relief region.

B4. The saw blade of any of paragraphs B1-B3, wherein the saw blade is a bandsaw blade.

B5. The saw blade of paragraph B4, wherein the bandsaw blade has a thickness of at least one of:
(i) at least 1 millimeter (mm), at least 1.25 mm, at least 1.5 mm, at least 1.75 mm, at least 2 mm, at least 2.25 mm, or at least 2.5 mm; and
(ii) at most 4 mm, at most 3.75 mm, at most 3.5 mm, at most 3.25 mm, at most 3 mm, at most 2.75 mm, at most 2.5 mm, at most 2.25 mm, or at most 2 mm.

B6. The saw blade of any of paragraphs B4-B5, wherein the bandsaw blade has a width of at least one of:
(i) at least 5 centimeters (cm), at least 7.5 cm, at least 10 cm, at least 15 cm, at least 20 cm, at least 25 cm, at least 30 cm, at least 35 cm, or at least 40 cm; and
(ii) at most 50 cm, at most 45 cm, at most 40 cm, at most 35 cm, or at most 30 cm.

B7. The saw blade of any of paragraphs B4-B6, wherein the bandsaw blade has a length, as measured about a perimeter thereof, of at least one of:
(i) at least 5 meters (m), at least 7.5 m, at least 10 m, at least 15 m, or at least 20 m; and
(ii) at most 40 m, at most 35 m, at most 30 m, at most 25 m, or at most 20 m.

B8. The saw blade of any of paragraphs B1-B3, wherein the saw blade is a circular saw blade.

B9. The saw blade of any of paragraphs B1-B8, wherein the saw blade is a wood-cutting saw blade.

B10. The saw blade of any of paragraphs B1-B9, wherein the saw blade is configured to cut wood.

B11. The saw blade of paragraph B10, wherein the plurality of teeth are a plurality of wood-cutting teeth.

B12. The saw blade of any of paragraphs B1-B11, wherein the saw blade has an average tooth pitch of at least one of:
(i) at least 0.5 centimeters (cm), at least 0.75 cm, at least 1 cm, at least 1.5 cm, at least 2 cm, at least 2.5 cm, or at least 3 cm; and
(ii) at most 5 cm, at most 4.5 cm, at most 4 cm, at most 3.5 cm, at most 3 cm, at most 2.5 cm, at most 2 cm, at most 1.5 cm, or at most 1 cm.

B13. The saw blade of any of paragraphs B1-B12, wherein the saw blade has an average gullet depth of at least one of:

(i) at least 0.25 centimeters (cm), at least 0.5 cm, at least 0.75 cm, at least 1 cm, at least 1.5 cm, at least 2 cm, or at least 2.5 cm; and (ii) at most 5 cm, at most 4.5 cm, at most 4 cm, at most 3.5 cm, at most 3 cm, at most 2.5 cm, at most 2 cm, at most 1.5 cm, or at most 1 cm.

C1. A method of machining a saw blade tooth profile of a saw blade with a blade milling system, the method comprising:

supporting the saw blade, via a blade support structure, such that a side of the saw blade extends perpendicular, or at least substantially perpendicular, to an end mill rotational axis of an end mill;

advancing the saw blade, via a blade advance structure and within the blade support structure, such that a target portion of the saw blade defines a working portion of the saw blade; and machining a finished tooth profile in the working portion of saw blade, with the end mill, by operatively translating the end mill relative to the saw blade with a milling head and within a plane that is perpendicular, or at least substantially perpendicular, to the end mill rotational axis.

C2. The method of paragraph C1, wherein the machining the finished tooth profile further includes rotating the end mill about the end mill rotational axis with a milling head.

C3. The method of paragraph C2, wherein the finished tooth profile is a right-handed tooth profile, wherein the end mill includes a left-hand cut, left-hand spiral end mill, and further wherein the rotating includes rotating the end mill in a counterclockwise direction as viewed from the milling head.

C4. The method of any of paragraphs C2-C3, wherein the finished tooth profile is a left-handed tooth profile, wherein the end mill includes a right-hand cut, right-hand spiral end mill, and further wherein the rotating includes rotating the end mill in a clockwise direction as viewed from the milling head.

C5. The method of any of paragraphs C1-C4, wherein, during the machining the finished tooth profile, the method further includes oscillating the end mill along the end mill rotational axis.

C6. The method of any of paragraphs C1-C5, wherein the machining the finished tooth profile includes sequentially:

(i) machining a tooth back of the finished tooth profile;
(ii) machining a tooth tip of the finished tooth profile;
(iii) machining a tooth face of the finished tooth profile; and
(iv) machining a tooth gullet of the finished tooth profile.

C7. The method of paragraph C6, wherein, prior to the machining the tooth back of the finished tooth profile, the machining the finished tooth profile includes initiating the machining the finished tooth profile within a tooth gullet of an adjacent tooth, which is adjacent to the finished tooth profile.

C8. The method of any of paragraphs C6-C7, wherein the machining the finished tooth profile includes utilizing a continuous motion of the end mill to machine the tooth back of the finished tooth profile, the tooth tip of the finished tooth profile, the tooth face of the finished tooth profile, and the tooth gullet of the finished tooth profile.

C9. The method of any of paragraphs C6-C7, wherein the machining the tooth back of the finished tooth profile includes operatively translating, and optionally concurrently and operatively translating, the end mill in a first direction which is perpendicular to the end mill rotational axis, and in a second direction, which is perpendicular to the first direction and to the end mill rotational axis, optionally to machine an at least partially arcuate tooth back.

C10. The method of paragraph C9, wherein the machining the tooth tip of the finished tooth profile and the machining the tooth face of the finished tooth profile include operatively translating, and optionally concurrently and operatively translating, the end mill in a third direction, which is opposed to the first direction, and in a fourth direction, which is opposed to the second direction.

C11. The method of any of paragraphs C6-C10, wherein the machining the tooth tip is subsequent to the machining the tooth back.

C12. The method of any of paragraphs C6-C11, wherein the machining the tooth face is subsequent to the machining the tooth tip.

C13. The method of any of paragraphs C6-C12, wherein the machining the tooth face includes machining an at least partially arcuate tooth face.

C14. The method of any of paragraphs C6-C13, wherein the machining the tooth gullet of the finished tooth profile includes operatively translating, or concurrently and operatively translating, the end mill in a/the first direction and in a/the fourth direction.

C15. The method of any of paragraphs C6-C14, wherein the machining the tooth gullet is subsequent to the machining the tooth face.

C16. The method of any of paragraphs C1-C15, wherein, subsequent to the advancing and prior to the machining the finished tooth profile, the method further includes clamping the saw blade, via a blade clamp, to at least one of:

(i) restrict motion of the saw blade relative to the blade support structure during the machining the finished tooth profile;

(ii) restrict motion of the saw blade relative to the blade advance structure during the machining the finished tooth profile;

(iii) restrict motion of the saw blade relative to the milling head during the machining the finished tooth profile; and (iv) restrict motion of the saw blade during the machining the finished tooth profile.

C17. The method of any of paragraphs C1-C16, wherein the method further includes monitoring a tip height of a/the tooth tip of the finished tooth profile.

C18. The method of paragraph C17, wherein the tip height is measured relative to a blade back of the saw blade.

C19. The method of any of paragraphs C17-C18, wherein the tip height is measured relative to a center of mass of the saw blade.

C20. The method of any of paragraphs C17-C19, wherein the monitoring the tip height is subsequent to the machining the finished tooth profile.

C21. The method of any of paragraphs C17-C20, wherein the method further includes adjusting a location of the working portion of the saw blade within the plane that is perpendicular, or at least substantially perpendicular, to the end mill rotational axis based, at least in part, on the monitored tip height of the tooth tip of the finished tooth profile.

C22. The method of paragraph C21, wherein the adjusting includes adjusting to maintain the tip height of the tooth tip of the finished tooth profile at a desired tip height.

C23. The method of any of paragraphs C21-C22, wherein the adjusting includes adjusting with a height adjustment structure.

C24. The method of any of paragraphs C21-C23, wherein the adjusting includes operatively translating a/the blade back of the saw blade in a vertical direction with a/the height adjustment structure.

C25. The method of any of paragraphs C21-C24, wherein the adjusting includes at least one of:

(i) operatively translating a/the blade back of the saw blade toward the end mill rotational axis to decrease the tip height of the tooth tip of the finished tooth profile; and (ii) operatively translating the blade back of the saw blade away from the end mill rotational axis to increase the tip height of the tooth tip of the finished tooth profile.

C26. The method of any of paragraphs C1-C25, wherein the machining the finished tooth profile further includes machining a relief region that extends toward a/the tooth back of the finished tooth profile from at least one of a/the tooth face of the finished tooth profile and a/the tooth gullet of the finished tooth profile.

C27. The method of paragraph C26, wherein the machining the relief region is subsequent to machining the tooth tip of the finished tooth profile.

C28. The method of any of paragraphs C26-C27, wherein the machining the relief region is subsequent to machining the tooth face of the finished tooth profile.

C29. The method of any of paragraphs C26-C28, wherein the machining the relief region is prior to machining the tooth gullet of the finished tooth profile.

C30. The method of any of paragraphs C26-C29, wherein the machining the relief region includes utilizing a continuous motion of the end mill to transition from machining the tooth face to the machining the relief region and to transition from the machining the relief region to machining the tooth gullet.

C31. The method of any of paragraphs C26-C30, wherein machining the tooth face of the finished tooth profile includes operatively translating the end mill in a straight, or at least substantially straight, line, and further wherein the machining the relief region includes operatively translating the end mill away from the straight, or at least substantially straight, line and toward a/the tooth back of the finished tooth profile.

C32. The method of any of paragraphs C1-C31, wherein the saw blade is a bandsaw blade that defines a bandsaw blade length as measured about a perimeter thereof, and further wherein the supporting the saw blade includes supporting along, or along an entirety of, the bandsaw blade length with a plurality of bandsaw-contacting structures, and optionally with a plurality of rollers.

C33. The method of any of paragraphs C1-C32, wherein, prior to the machining the finished tooth profile, the saw blade includes a plurality of rough-cut saw teeth, wherein the blade advance structure includes an indexing structure configured to operatively engage a given rough-cut saw tooth of the plurality of rough-cut saw teeth, and further wherein the advancing includes operatively engaging the given rough-cut saw tooth, and optionally a given rough-cut tooth face of the given rough-cut saw tooth, to operatively translate the saw blade within the blade support structure.

C34. The method of any of paragraphs C1-C33, wherein the machining the finished tooth profile includes machining an entirety of the finished tooth profile in a single pass.

C35. The method of any of paragraphs C1-C34, wherein the machining the finished tooth profile includes machining without utilizing a liquid coolant to cool a cutting edge of the end mill.

C36. The method of any of paragraphs C1-C35, wherein the machining the finished tooth profile includes machining without utilizing a liquid lubricant to lubricate a/the cutting edge of the end mill.

C37. The method of any of paragraphs C1-C36, wherein the machining the finished tooth profile includes machining without utilizing a/the liquid coolant to cool the saw blade.

C38. The method of any of paragraphs C1-C37, wherein the machining the finished tooth profile includes machining without utilizing a/the liquid lubricant to lubricate the saw blade.

C39. The method of any of paragraphs C1-C38, wherein the machining the finished tooth profile includes dry-machining the finished tooth profile.

C40. The method of any of paragraphs C1-C39, wherein the working portion of the saw blade is a first working portion of the saw blade, wherein the finished tooth profile is a first finished tooth profile, and further wherein the method includes repeating at least the advancing and the machining the finished tooth profile, while continuing the supporting, to machine a second finished tooth profile within a second working portion of the saw blade that is spaced-apart from the first working portion of the saw blade.

C41. The method of paragraph C40, wherein the method includes machining an entirety of the first finished tooth profile prior to machining the second finished tooth profile.

C42. The method of any of paragraphs C40-C41, wherein the first finished tooth profile is similar, or identical, to the second finished tooth profile.

C43. The method of any of paragraphs C40-C42, wherein the first finished tooth profile differs from the second finished tooth profile in at least one respect.

C44. The method of any of paragraphs C40-C43, wherein at least one of:

(i) a tip height of the first finished tooth profile differs from a tip height of the second finished tooth profile;

(ii) a tooth shape of the first finished tooth profile differs from a tooth shape of the second finished tooth profile; and (iii) a tooth pitch of the first finished tooth profile differs from a tooth pitch of the second finished tooth profile.

C45. The method of any of paragraphs C1-C44, wherein the finished tooth profile is a finished cutting tooth profile.

C46. The method of any of paragraphs C1-C45, wherein the method includes performing the method utilizing any suitable structure, component, and/or feature of any of the blade milling systems of any of paragraphs A1-A46.

C47. The method of any of paragraphs C1-C45, wherein the blade milling system includes the blade milling system of any of paragraphs A1-A46.

C48. The method of any of paragraphs C1-C47, wherein, subsequent to performing the method, the saw blade includes the saw blade of any of paragraphs B1-B13.

C49. A saw blade produced by the method of any of paragraphs C1-C48.

C50. The saw blade of paragraph C49, wherein the saw blade is a bandsaw blade.

C51. The saw blade of paragraph C49, wherein the saw blade is a circular saw blade.

D1. A method of machining a saw blade tooth profile of a saw blade with a blade milling system, the method comprising:

supporting the saw blade, via a blade support structure, such that a side of the saw blade extends perpendicular, or at least substantially perpendicular, to an end mill rotational axis of an end mill;

advancing the saw blade, via a blade advance structure and within the blade support structure, such that a target portion of the saw blade defines a working portion of the saw blade; and dry-machining a finished tooth profile in the working portion of the saw blade in a single pass and with the end mill by operatively translating the end mill relative to the saw blade and within a plane that is perpendicular, or at least substantially perpendicular, to the end mill rotational axis.

D2. The method of paragraph D1, wherein the dry-machining includes rotating the end mill about an end mill rotational axis, wherein the dry-machining further includes operatively translating the end mill within an end mill translation plane that is perpendicular, or at least substantially perpendicular, to the end mill rotational axis to define the finished tooth profile in the working portion of the saw blade.

D3. The method of any of paragraphs D1-D2, wherein the supporting the saw blade includes supporting utilizing any suitable structure, component and/or feature of any of the blade milling systems of any of paragraphs A1-A46.

D4. The method of any of paragraphs D1-D3, wherein the supporting the saw blade includes performing any suitable portion of any suitable step of any of the methods of any of paragraphs C1-C48.

D5. The method of any of paragraphs D1-D4, wherein the advancing the saw blade includes advancing utilizing any suitable structure, component, and/or feature of any of the blade milling systems of any of paragraphs A1-A46.

D6. The method of any of paragraphs D1-D5, wherein the advancing the saw blade includes performing any suitable step of any of the methods of any of any of paragraphs C1-C48.

D7. The method of any of paragraphs D1-D6, wherein the dry-machining includes machining without utilizing a liquid coolant to cool a cutting edge of the end mill.

D8. The method of any of paragraphs D1-D7, wherein the dry-machining includes machining without utilizing a liquid lubricant to lubricate a/the cutting edge of the end mill.

D9. The method of any of paragraphs D1-D8, wherein the dry-machining includes machining without utilizing a/the liquid coolant to cool the saw blade.

D10. The method of any of paragraphs D1-D9, wherein the dry-machining includes machining without utilizing a/the liquid lubricant to lubricate the saw blade.

D11. The method of any of paragraphs D1-D10, wherein the dry-machining includes dry-machining an entirety of the finished tooth profile in the single pass.

D12. The method of any of paragraphs D1-D11, wherein the working portion of the saw blade is a first working portion of the saw blade, wherein the finished tooth profile is a first finished tooth profile, and further wherein the method includes repeating at least the advancing and the dry-machining, while continuing the supporting, to dry machine a second finished tooth profile within a second working portion of the saw blade that is spaced-apart from the first working portion of the saw blade.

D13. The method of paragraph D12, wherein the method includes dry-machining an entirety of the first finished tooth profile prior to dry-machining the second finished tooth profile.

D14. The method of any of paragraphs D12-D13, wherein the first finished tooth profile is similar, or identical, to the second finished tooth profile.

D15. The method of any of paragraphs D12-D14, wherein the first finished tooth profile differs from the second finished tooth profile in at least one respect.

D16. The method of any of paragraphs D12-D15, wherein at least one of:

(i) a tip height of the first finished tooth profile differs from a tip height of the second finished tooth profile;

(ii) a tooth shape of the first finished tooth profile differs from a tooth shape of the second finished tooth profile; and (iii) a tooth pitch of the first finished tooth profile differs from a tooth pitch of the second finished tooth profile.

D17. The method of any of paragraphs D1-D16, wherein the method includes performing the method utilizing any suitable structure, component, and/or feature of any of the blade milling systems of any of paragraphs A1-A46.

D18. The method of any of paragraphs D1-D17, wherein the blade milling system includes the blade milling system of any of paragraphs A1-A46.

D19. The method of any of paragraphs D1-D18, wherein, subsequent to performing the method, the saw blade includes the saw blade of any of paragraphs B1-B13.

INDUSTRIAL APPLICABILITY

The systems and methods disclosed herein are applicable to the saw blade manufacturing and woodworking industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A bandsaw blade, comprising:
a blade body; and
a plurality of swaged teeth defined by the blade body, wherein:
(i) each swaged tooth in the plurality of swaged teeth includes a tooth back, a tooth tip, a tooth face, and a tooth gullet that are unitary with the blade body such that the blade body and the plurality of swaged teeth are formed from a contiguous piece of material, wherein the tooth face extends within a tooth face plane;
(ii) a milled relief region extends, in at least one tooth of the plurality of swaged teeth, away from the tooth face plane and toward the tooth back, and separates the tooth face from the tooth gullet, wherein the tooth face has a length that is greater than a distance defined by the milled relief region between the tooth face and the tooth gullet; and wherein the at least one tooth of the plurality of swaged teeth includes a first shoulder that defines a transition region between the milled relief region and the tooth face and a second shoulder that defines a transition region between the milled relief region and the tooth gullet.

2. The bandsaw blade of claim 1, wherein the tooth face is an at least substantially planar tooth face.

3. The bandsaw blade of claim 1, wherein the milled relief region is an arcuate relief region.

4. The bandsaw blade of claim 1, wherein the bandsaw blade has a thickness of at least 1 millimeter and at most 4 millimeters, a width of at least 5 centimeters and at most 50 centimeters, and a length, as measured about a perimeter thereof, of at least 5 meters and at most 40 meters.

5. The bandsaw blade of claim 1, wherein the bandsaw blade is a wood-cutting bandsaw blade.

6. The bandsaw blade of claim 1, wherein the tooth face is a planar tooth face.

7. The bandsaw blade of claim 1, wherein the distance is a straight-line distance between opposite ends of the milled relief region.

8. The bandsaw blade of claim 1, wherein a first end of the milled relief region extends from the tooth face away from the tooth face plane, wherein a second end of the milled relief region intersects the tooth face plane distal the tooth face, and further wherein the length of the tooth face is greater than a straight-line distance between the first end of the milled relief region and the second end of the milled relief region.

9. A bandsaw blade, comprising:
a blade body; and
a plurality of swaged teeth, wherein:
(i) each swaged tooth in the plurality of swaged teeth includes a tooth back, a tooth tip, a tooth face, and a tooth gullet that are unitary with the blade body such that the blade body and the plurality of swaged teeth are formed from a contiguous piece of material, wherein the tooth face extends within a tooth face plane; and (ii) a milled relief region extends, in at least one tooth of the plurality of swaged teeth, away from the tooth face plane and toward the tooth back, and separates the tooth face from the tooth gullet, wherein the milled relief region forms a first shoulder with the tooth gullet where the mill relief region meets the tooth gullet, and wherein the millet relief region forms a second shoulder with the tooth face where the milled relief region meets the tooth face; and wherein the milled relief region defines a distance between the tooth face and the tooth gullet that is shorter than a length of the tooth face.

10. The bandsaw blade of claim 9, wherein the milled relief region has a smaller radius of curvature than the tooth gullet.

11. The bandsaw blade of claim 9, wherein the tooth face is a planar tooth face.

12. The bandsaw blade of claim 9, wherein the first shoulder is positioned above a bottom of the tooth gullet.

13. The bandsaw blade of claim 12, wherein from the bottom of the tooth gullet, the tooth gullet extends up towards the tooth tip and ends at the first shoulder.

14. The bandsaw of claim 9, wherein the distance is a straight-line distance between opposite ends of the milled relief region.

15. The bandsaw blade of claim 9, wherein a first end of the milled relief region intersects the tooth face plane distal the tooth face, wherein a second end of the milled relief region extends from the tooth face away from the tooth face plane, and further wherein the distance is a straight-line distance between the first end of the milled relief region and the second end of the milled relief region.

\* \* \* \* \*